US007848425B2

(12) United States Patent
Cho et al.

(10) Patent No.: US 7,848,425 B2
(45) Date of Patent: Dec. 7, 2010

(54) METHOD AND APPARATUS FOR ENCODING AND DECODING STEREOSCOPIC VIDEO

(75) Inventors: Suk-Hee Cho, Daejon (KR); Yun-Jung Choi, Daejon (KR); Kug-Jin Yun, Daejon (KR); Jin-Hwan Lee, Daejon (KR); Young-Kwon Hahm, Daejon (KR); Chieteuk Ahn, Daejon (KR); Yong-Han Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1276 days.

(21) Appl. No.: 10/540,891

(22) PCT Filed: Jan. 22, 2003

(86) PCT No.: PCT/KR03/00132

§ 371 (c)(1), (2), (4) Date: Dec. 28, 2005

(87) PCT Pub. No.: WO2004/059980

PCT Pub. Date: Jul. 15, 2004

(65) Prior Publication Data

US 2006/0133493 A1    Jun. 22, 2006

(30) Foreign Application Priority Data

Dec. 27, 2002 (KR) .................. 10-2002-0084724

(51) Int. Cl.
  *H04N 7/12* (2006.01)
  *H04N 11/02* (2006.01)
  *H04N 11/04* (2006.01)

(52) U.S. Cl. .................. 375/240.16; 375/240.03; 375/240.12; 375/240.2; 348/42

(58) Field of Classification Search ............ 375/240.16, 375/3, 12, 2
See application file for complete search history.

(56) References Cited

U.S. PATENT DOCUMENTS 5,612,735 A    3/1997    Haskell et al.

(Continued)

FOREIGN PATENT DOCUMENTS

JP         09027969 A    1/1997

(Continued)

OTHER PUBLICATIONS

International Organisation for Standardisation Organistion Internationale DE Normalisation ISO/IEC JTC1/SC29/WG11 Coding of Moving Pictures and Audio; MPEG2002/N5169, Shanghai, China Oct. 2002.*

(Continued)

*Primary Examiner*—Marsha D Banks Harold
*Assistant Examiner*—Jessica Roberts
(74) *Attorney, Agent, or Firm*—Ladas & Parry LLP

(57) ABSTRACT

Stereoscopic video is encoded and decoded by using the MAC defined by the existing MPEG-4 standard. The stereoscopic video is divided into one image as a single video object, and another image as auxiliary information for the image established as the video object. The auxiliary information includes a horizontal disparity map, a vertical disparity map, luminance residual texture, and chrominance residual texture, which are respectively allocated to auxiliary components of the MAC according to importance and complexity of the images, encoded, and then output as a single encoding stream.

41 Claims, 21 Drawing Sheets

| Video_object_layer_shape_extension | aux_comp_type[0] | aux_comp_type[1] | aux_comp_type[2] | aux_comp_type_count |
|---|---|---|---|---|
| 0000 | ALPHA | NO | NO | 1 |
| 0001 | DISPARITY | NO | NO | 1 |
| 0010 | ALPHA | DISPARITY | NO | 2 |
| 0011 | DISPARITY | DISPARITY | NO | 2 |
| 0100 | ALPHA | DISPARITY | DISPARITY | 3 |
| 0101 | DEPTH | NO | NO | 1 |
| 0110 | ALPHA | DEPTH | NO | 2 |
| 0111 | TEXTURE | NO | NO | 1 |
| 1000 | USER DEFINED | NO | NO | 1 |
| 1001 | USER DEFINED | USER DEFINED | NO | 2 |
| 1010 | USER DEFINED | USER DEFINED | USER DEFINED | 3 |
| 1011 | ALPHA | USER DEFINED | NO | 2 |
| 1100 | ALPHA | USER DEFINED | USER DEFINED | 3 |
| 1101 - 1111 | t.b.d | t.b.d | t.b.d | t.b.d |

U.S. PATENT DOCUMENTS

| | | | |
|---|---|---|---|
| 5,619,256 A * | 4/1997 | Haskell et al. | 348/43 |
| 5,633,682 A | 5/1997 | Tahara | |
| 5,696,551 A | 12/1997 | Katto | |
| 6,055,274 A | 4/2000 | McVeigh | |
| 6,313,866 B1 * | 11/2001 | Akamatsu et al. | 348/51 |
| 6,314,211 B1 * | 11/2001 | Kim et al. | 382/285 |
| 7,194,126 B2 * | 3/2007 | Konolige | 382/154 |
| 2002/0009137 A1 * | 1/2002 | Nelson et al. | 375/240.1 |

FOREIGN PATENT DOCUMENTS

| | | |
|---|---|---|
| KR | 1020030083285 | 10/2003 |
| WO | 99/53681 A2 | 10/1999 |

OTHER PUBLICATIONS

International Organisation for Standardisation Organisation Internationale de Normalisation ISO/IEC JTC1/SC29/WG11 Coding of Moving Pictures and Audio; MPEG 2002/N5169, Shanghai, China, Oct. 2002.*

Sukhee Cho; et al., "Report for EE3 in MPEG 3DAV" MPEG (ISO/IEC JTC1/SC29/WG11), No. M9186, Dec. 6, 2002, pp. 1-5, XP030038114, Awaji, Japan, Sections 1 and 3.

"Description of Exploration Experiments in 3DAV", MPEG (ISO/IEC JTC1/SC29/WG11), No. N5169, Oct. 25, 2002, pp. 1-9, XP030012488 Shanghai, China (abstract) section 4 "EE3-Stereoscopic video coding using MAC".

Jens-Rainer Ohm et al; "Report on Multiview CE MI", MPEG (ISO/IEC JTC1/SC29/WG11), No. M3640, Jun. 30, 1998, pp. 1-8, XP030032912, Dublin, Ireland, sections 2.1, 2.3, 3 and 4, first paragraph; in particular sections 3.1 and 4, first paragraph.

Jens-Rainer Ohm et al; "Incomplete 3D Representation of Video Objects", MPEG (ISO/IEC JTC1/SC29/WG11), No. M2639, Oct. 19, 1997, pp. 1-9, XP030031913 Fribourg, sections 2 and 4.2 with figures 2 and 3; in particular p. 2, "number_of_feature_maps".

European Search Report: EP03 70 3399.

Rob Koenen; "MPEG-4 Overview-(V.18-Singapore Version)", International Organisation for Standardisation Organisation Internationalw De Normalisation ISO/IEC JTC1/SC29/WG11 N4030 Mar. 2001 Coding of Moving Pictures and Audio.

Andrew Woods et al; "3D Video Standards Conversion", Stereoscopic Displays and Applications VII, California, Feb. 1996, Proceedings of the SPIE vol. 2653A.

A Smolic, et al; "Description of Exploration Experiments in 3DAV", ISO/IEC JTC1/SC29/WG11, MPEG2002/N4929, Jul. 2002.

Mi-Hyun Kim, et al; "Edge-preserving directional regularization technique for disparity estimation of stereoscopic images", Consumer Electronics, 1999. ICCE. International Conference on 1999, pp. 376-377.

Yunjong Choi, et al. "Limitations on 3D real video coding using MAC", ISOIEC JTC1/SC29/WG11, MPEG2002/M8627 Jul. 2002.

* cited by examiner

Fig. 1

| Video_object_layer_shape_extension | aux_comp_type[0] | aux_comp_type[1] | aux_comp_type[2] | aux_comp_type_count |
|---|---|---|---|---|
| 0000 | ALPHA | NO | NO | 1 |
| 0001 | DISPARITY | NO | NO | 1 |
| 0010 | ALPHA | DISPARITY | NO | 2 |
| 0011 | DISPARITY | DISPARITY | NO | 2 |
| 0100 | ALPHA | DISPARITY | DISPARITY | 3 |
| 0101 | DEPTH | NO | NO | 1 |
| 0110 | ALPHA | DEPTH | NO | 2 |
| 0111 | TEXTURE | NO | NO | 1 |
| 1000 | USER DEFINED | NO | NO | 1 |
| 1001 | USER DEFINED | USER DEFINED | NO | 2 |
| 1010 | USER DEFINED | USER DEFINED | USER DEFINED | 3 |
| 1011 | ALPHA | USER DEFINED | NO | 2 |
| 1100 | ALPHA | USER DEFINED | USER DEFINED | 3 |
| 1101 – 1111 | t.b.d | t.b.d | t.b.d | t.b.d |

Fig. 4

| Video_object_layer_shape_extension | aux_comp_type[0] | aux_comp_type[1] | aux_comp_type[2] | aux_comp_count |
|---|---|---|---|---|
| 1101 | Horizontal DISPARITY | Luminance Residual texture | NO | 2 |
| 1110 | Horizontal DISPARITY | Luminance Residual texture | Chrominance Residual texture | 3 |
| 1111 | Horizontal DISPARITY | Vertical DISPARITY | Luminance Residual texture | 3 |

Fig. 5

| Video_object_layer_shape_extension | aux_comp_type[0] | aux_comp_type[1] | aux_comp_type[2] | aux_comp_type[3] | aux_comp_count |
|---|---|---|---|---|---|
| 1010 | Horizontal DISPARITY | Vertical DISPARITY | Luminance Residual texture | Chrominance Residual texture | 4 |

Fig. 8

| First mb of video object (left image) | First mb of AC[0] (HDM) | First mb of AC[1] (LRT) | Second mb of video object (left image) | Second mb of AC[0] (HDM) | Second mb of AC[1] (LRT) | ... | Nth mb of video object (left image) | Nth mb of AC[0] (HDM) | Nth mb of AC[1] (LRT) |
|---|---|---|---|---|---|---|---|---|---|

- AC: Auxiliary Component
- HDM: Horizontal Disparity Map
- mb: macroblok
- LRT: Luminance Residual Texture

Fig. 11

| First mb of video object (left image) | First mb of AC[0] (HDM) | First mb of AC[1] (LRT) | First mb of AC[2] (CRT) | Second mb of video object (left image) | Second mb of AC[0] (HDM) | Second mb of AC[1] (LRT) | Second mb of AC[2] (CRT) |

• • •

| Nth mb of video object (left image) | Nth mb of AC[0] (HDM) | Nth mb of AC[1] (LRT) | Nth mb of AC[2] (CRT) |

- AC: Auxiliary Component
- HDM: Horizontal Disparity Map
- mb: macroblok
- LRT: Luminance Residual Texture
- CRT: Chrominance Residual Texture

METHOD AND APPARATUS FOR ENCODING AND DECODING STEREOSCOPIC VIDEO

CROSS REFERENCE TO RELATED APPLICATION

This application claims priority to and the benefit of Korea Patent Application No. 2003-84724 filed on Dec. 27, 2002 in the Korean Intellectual Property Office, the content of which is incorporated herein by reference.

BACKGROUND OF THE INVENTION (a) Field of the Invention

The present invention relates to a method and device for encoding and decoding stereoscopic video. More specifically, the present invention relates to a method and device for encoding and decoding stereoscopic video into an encoding stream by using a conventional MPEG-4 MAC (multiple auxiliary component.)

(b) Description of the Related Art

A MVP (multi-view profile) method for extending two-dimensional video encoding techniques in the MPEG-2 technology has been developed as a conventional stereoscopic video encoding method. As to the MVP method, an encoding structure of a base layer for performing encoding by using motion compensation corresponds to that of the MPEG-2 MP (main profile), and hence, one of the right and left images is reconstructed when the conventional 2-dimensional video decoder reconstructs the data of the base layer, thereby maintaining compatibility with the existing 2-dimensional video decoder system. An encoder of an enhancement layer uses correlation information provided between the right and left images to perform encoding. This is a method for performing encoding by using temporal scalability, and the MPEG-4 standard has also defined the temporal scalability using stereoscopic video encoding.

The above-noted prior art has been disclosed by U.S. Pat. No. 5,612,735 entitled "Digital 3D/stereoscopic video compensation technique utilizing two disparity estimates." Regarding the '735 patent on the temporal scalability basis, a base layer uses a motion compensation algorithm and DCT (discrete cosine transform) base algorithm to encode images of the left eye, and an enhancement layer uses disparity information of between the base layer and the enhancement layer to encode the images of the right eye without motion compensation for the images of the right eye.

Also, as to the U.S. Pat. No. 5,619,256 entitled "Digital 3D/stereoscopic video compensation technique utilizing disparity and motion compensated predictions," the base layer uses a motion compensation algorithm and DCT base algorithm to encode images of the left eye, and the enhancement layer uses information on the motion compensation between the images of the right eye and disparity of between the base layer and the enhancement layer to encode the images of the right eye on the temporal scalability basis in the like manner of the '735 patent. This method achieves efficient compression rates by performing encoding by using motion and disparity information, but the method has a complicated encoding structure and it is difficult to realize the method in the hardwired manner, and the method requires a large amount of calculation when processing HDTV images.

Therefore, in the case of encoding stereoscopic video by using temporal scalability, an additional multiplexer for transmitting respective encoding streams output by the base layer and the enhancement layer as a single stream is problematically needed in order to simplify a synchronization problem between the right and left images.

Conventional multi-view video encoding methods include a method for performing encoding by using a disparity map having disparity vector values of pixels, which has been disclosed by U.S. Pat. No. 6,055,274 entitled "Method and apparatus for compressing multi-view video."

The '274 patent encodes the total image data of the first image (a left image), and generates a disparity map having disparity vector values for respective pixels from the first image and a second image (a right image) to perform encoding on the motion compensated disparity vectors, and uses a reconstructed first image after the encoding to disparity-compensate for a reconstructed disparity map and encode residual image data of between the generated second image and the input second original image. This method problematically outputs a plurality of encoding streams, and additionally requires a multiplexer for transmitting them in a single stream format.

In order to use the conventional MPEG codecs for 2-dimensional images, and perform simple synchronization between the right and left images in the stereoscopic video, a method for reducing the respective right and left images by ½ and converting them into 2-dimensional standard images has been proposed in five methods in the transactions of "3D video standards conversion, stereoscopic displays and applications," by Andrew Woods, Tom Docherty, and Rolf Koch (VII, California, February 1996, Proceedings of the SPIE vol. 1653A).

The above technique is also published in U.S. Pat. No. 5,633,682 entitled "Stereoscopic coding system."

The invention published as '682 selects odd-field images for the images of the left eye and even-field images for the images of the right eye to convert them into a single image, and accordingly performs MPEG encoding on the converted single image with respect to the existing 2-dimensional images. This method considers a shuttering method for alternately displaying the right and left images in the case of displaying the stereoscopic video, and the method is not suitable for polarized displays that concurrently display the right and left images.

SUMMARY OF THE INVENTION

It is an advantage of the present invention to maintain compatibility for using existing MPEG-4 encoding techniques and systems, and minimize complexity of synchronization between the right and left images.

It is another advantage of the present invention to selectively control quality of images and encode the images according to importance or complexity of the images, thereby improving encoding efficiencies.

In the first aspect of the present invention, a method for encoding stereoscopic video including first and second images comprises: (a) encoding the first image, and outputting a quantized video object and a motion vector of the first image; (b) receiving the first and second images, and finding a pixel-based horizontal disparity map on the second image with reference to the first image; and (c) encoding the horizontal disparity map and outputting a quantized horizontal disparity map based on the pixel-based horizontal disparity map and a motion vector.

In the second aspect of the present invention, a method for encoding stereoscopic video including first and second images comprises: (a) encoding the first image, and outputting a quantized video object and a motion vector of the first image; (b) decoding the quantized video object output in (a), and reconstructing the first image; (c) receiving the first and second images, and finding a pixel-based horizontal disparity map on the second image with reference to the first image; (d) encoding the horizontal disparity map and outputting a quantized horizontal disparity map based on the pixel-based horizontal disparity map and the motion vector; (e) reconstructing the quantized horizontal disparity map output in (d), and outputting a reconstructed horizontal disparity map; (f) performing disparity compensation and outputting a pixel value of a disparity-compensated second image based on a pixel value of the first image reconstructed in (b) and a horizontal disparity vector value of the horizontal disparity map reconstructed in (e); and (g) performing a residual process on the pixel value of the second image and the pixel value of the disparity-compensated second image output in (f) to output luminance residual texture, and encoding the luminance residual texture to output quantized luminance residual texture.

In the third aspect of the present invention, a method for encoding stereoscopic video including first and second images comprises: (a) encoding the first image, and outputting a quantized video object and a motion vector of the first image; (b) decoding the quantized video object output in (a), and reconstructing the first image; (c) receiving the first and second images, and finding a pixel-based horizontal disparity map and a pixel-based vertical disparity map on the second image with reference to the first image; (d) encoding the horizontal disparity map and outputting a quantized horizontal disparity map based on the pixel-based horizontal disparity map and the motion vector; (e) encoding the vertical disparity map and outputting a quantized vertical disparity map based on the pixel-based vertical disparity map and the motion vector; (f) reconstructing the quantized horizontal disparity map output in (d), and outputting a reconstructed horizontal disparity map; (g) reconstructing the quantized vertical disparity map output in (d), and outputting a reconstructed vertical disparity map; (h) performing disparity compensation and outputting a pixel value of a disparity-compensated second image based on a pixel value of the first image reconstructed in (b), a horizontal disparity vector value of the horizontal disparity map reconstructed in (f), and a vertical disparity vector value of the vertical disparity map reconstructed in (h); and (i) performing a residual process on the pixel value of the second image and the pixel value of the disparity-compensated second image output in (h) to output luminance residual texture, and encoding the luminance residual texture to output quantized luminance residual texture.

In the fourth aspect of the present invention, a method for decoding stereoscopic video including first and second images comprises: (a) receiving an encoding stream, and outputting quantized data of a video object of the first image, a motion vector, and quantized data of a horizontal disparity map; (b) decoding the video object and reconstructing the first image based on the quantized data of the video object and the motion vector; (c) decoding the quantized data of the horizontal disparity map based on the quantized data of the horizontal disparity map and the motion vector; and (d) performing disparity compensation based on the reconstructed first image and the decoded horizontal disparity map, and reconstructing the second image.

In the fifth aspect of the present invention, a method for decoding stereoscopic video including first and second images comprises: (a) receiving an encoding stream, and outputting quantized data of a video object of the first image, a motion vector, quantized data of a horizontal disparity map, and quantized data of luminance residual texture; (b) decoding the video object and reconstructing the first image based on the quantized data of the video object and the motion vector; (c) decoding the quantized data of the horizontal disparity map based on the quantized data of the horizontal disparity map and the motion vector; (d) decoding the quantized data of the luminance residual texture based on the quantized data of the luminance residual texture and the motion vector; (e) performing disparity compensation based on the reconstructed first image and the decoded horizontal disparity map, and outputting disparity-compensated luminance texture; and (f) adding the disparity-compensated luminance texture and the luminance residual texture reconstructed in (d) to reconstruct the second image.

In the sixth aspect of the present invention, a method for decoding stereoscopic video including first and second images comprises: (a) receiving an encoding stream, and outputting quantized data of a video object of the first image, a motion vector, quantized data of a horizontal disparity map, quantized data of a vertical disparity map, and quantized data of luminance residual texture; (b) decoding the video object and reconstructing the first image based on the quantized data of the video object and the motion vector; (c) decoding the quantized data of the horizontal disparity map based on the quantized data of the horizontal disparity map and the motion vector; (d) decoding the quantized data of the vertical disparity map based on the quantized data of the vertical disparity map and the motion vector; (e) decoding the quantized data of the luminance residual texture based on the quantized data of the luminance residual texture and the motion vector; (f) performing disparity compensation based on the reconstructed first image, the decoded horizontal disparity map, and the decoded vertical disparity map, and outputting disparity-compensated luminance texture; and (g) adding the disparity-compensated luminance texture and the luminance residual texture reconstructed in (e) to reconstruct the second image.

In the seventh aspect of the present invention, an encoder for stereoscopic video including first and second images comprises: a video object encoder for encoding the first image, and outputting a quantized video object and a motion vector of the first image; a disparity estimator for receiving the first and second images, and finding a pixel-based horizontal disparity map on the second image with reference to the first image; and an auxiliary component encoder for encoding the horizontal disparity map and outputting a quantized horizontal disparity map based on the pixel-based horizontal disparity map output by the disparity estimator and a motion vector output by the video object encoder.

In the eighth aspect of the present invention, an encoder for stereoscopic video including first and second images comprises: a video object encoder for encoding the first image to output a quantized video object and a motion vector of the first image, and encoding the quantized video object to output a reconstructed first image; a disparity estimator for receiving the first and second images, and finding a pixel-based horizontal disparity map on the second image with reference to the first image; a first auxiliary component encoder for encoding the horizontal disparity map to output a quantized horizontal disparity map, and decoding the output and quantized horizontal disparity map to output a reconstructed horizontal disparity map based on the pixel-based horizontal disparity map output by the disparity estimator and the motion vector output by the video object encoder; a disparity compensator for performing disparity compensation and outputting a pixel value of a disparity-compensated second image based on a pixel value of the reconstructed first image output by the video object encoder and a horizontal disparity vector value of the reconstructed horizontal disparity map output by the first auxiliary component encoder; and a second auxiliary component encoder for performing a residual process on the pixel value of the second image and the pixel value of the disparity-compensated second image output by the disparity compensator to output luminance residual texture, and encoding the luminance residual texture to output quantized luminance residual texture.

In the ninth aspect of the present invention, a decoder for stereoscopic video including first and second images comprises: a variable length decoder for receiving an encoding stream, and outputting quantized data of a video object of the first image, a motion vector, and quantized data of a horizontal disparity map; a video object decoder for decoding the video object and reconstructing the first image based on the quantized data of the video object and the motion vector output by the variable length decoder; an auxiliary component decoder for decoding the quantized data of the horizontal disparity map based on the quantized data of the horizontal disparity map and the motion vector output by the variable length decoder; and disparity compensator for performing disparity compensation based on the reconstructed first image output by the video object decoder and the decoded horizontal disparity map output by the auxiliary component decoder, and reconstructing the second image.

In the tenth aspect of the present invention, a decoder for stereoscopic video including first and second images comprises: a variable length decoder for receiving an encoding stream, and outputting quantized data of a video object of the first image, a motion vector, quantized data of a horizontal disparity map, and quantized data of luminance residual texture; a video object decoder for decoding the video object and reconstructing the first image based on the quantized data of the video object and the motion vector; a first auxiliary component decoder for decoding the quantized data of the horizontal disparity map based on the quantized data of the horizontal disparity map and the motion vector; a second auxiliary component decoder for decoding the quantized data of the luminance residual texture based on the quantized data of the luminance residual texture and the motion vector; a disparity compensator for performing disparity compensation based on the reconstructed first image output by the video object decoder and the decoded horizontal disparity map output by the first auxiliary component decoder, and outputting disparity-compensated luminance texture and disparity-compensated chrominance texture; and a first adder for adding the disparity-compensated luminance texture output by the disparity compensator and the reconstructed luminance residual texture output by the second auxiliary component decoder.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 1 shows types and numbers of auxiliary components of video_object_layer_shape_extension defined by the MPEG-4 standards;

FIG. 4 shows types and numbers of auxiliary components of video_object_layer_shape_extension which requires additional definition for encoding the stereoscopic video according to a preferred embodiment of the present invention;

FIG. 5 shows types and numbers of auxiliary components of video_object_layer_shape_extension which requires additional definition when increasing the number of auxiliary components of the MAC (multiple auxiliary component) to greater than four;

FIG. 8 shows an encoding stream output by the encoder according to a second preferred embodiment of the present invention;

FIG. 11 shows an encoding stream output by the encoder according to a third preferred embodiment of the present invention;

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

The current MPEG-4 codec allocates auxiliary information including alpha, disparity, and depth which relate to respective video objects to an MAC (multiple auxiliary component) including three auxiliary components to encode them.

The present invention relates to a method for using the MPEG-4 MAC to encode the stereoscopic video, and auxiliary information to be allocated to the MAC will be defined.

The current MPEG-4 MAC is added to MPEG-4 visual version 2 so as to describe transparency of the video objects, and further, it defines auxiliary information including disparity, depth, and additional texture relating to the video objects.

FIG. 1 shows types and numbers of auxiliary components of video_object_layer_shape_extension defined by the MPEG-4 standards.

As shown, values of video_object_layer_shape_extension in which the auxiliary components include the disparity type are defined as 0001, 0010, 0011, and 0100, and no auxiliary components are defined to the values of from 1101 to 1111.

In the preferred embodiment, undefined auxiliary components of video_object_layer_shape_extension values are defined to include needed auxiliary information for more effective encoding of stereoscopic video.

Figure 2:
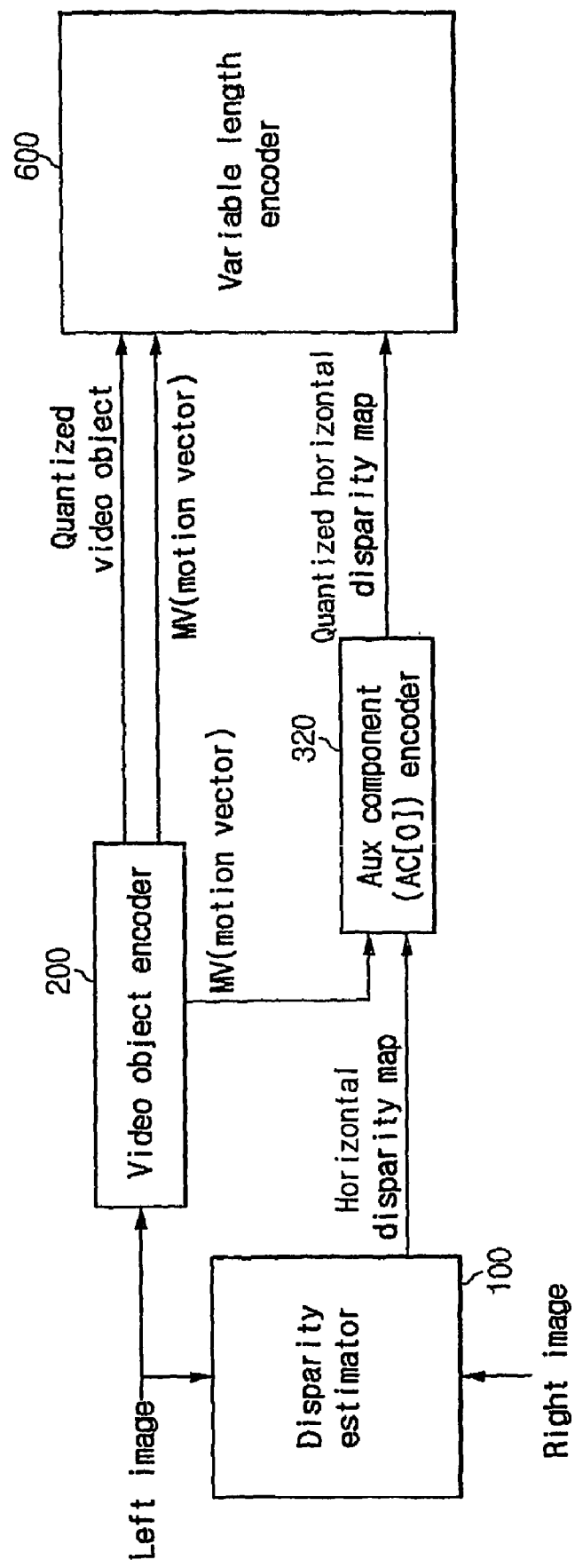
FIG. 2 shows a stereoscopic video encoder according to a first preferred embodiment of the present invention.

FIG. 2 shows a stereoscopic video encoder according to a first preferred embodiment of the present invention. The encoder uses auxiliary components defined by the existing MPEG-4 MAC shown in FIG. 1 to encode the stereoscopic video data.

As shown, the encoder comprises a disparity estimator 100, a video object encoder 200, an auxiliary component encoder 320, and a variable length encoder 600.

The video object encoder 200 receives one image (a left image in the preferred embodiment) of the stereoscopic video, and outputs a quantized video object and a motion vector. The disparity estimator 100 receives left and right images, and finds a pixel-based horizontal disparity map of the right image with reference to the left image. That is, the disparity estimator 100 outputs position vectors moved to the horizontal axis as a horizontal disparity map so as to search and estimate to what positions of the left image the pixels of the right image are provided.

The auxiliary component encoder 320 receives the horizontal disparity map which is an auxiliary component output by the disparity estimator 100 and the motion vector output by the video object encoder 200, and outputs a quantized horizontal disparity map.

The variable length encoder 600 receives the quantized video object and the motion vector output by the video object encoder 200 and the quantized horizontal disparity map output by the auxiliary component encoder 320, performs variable length encoding, and outputs an encoding stream.

Figure 3:
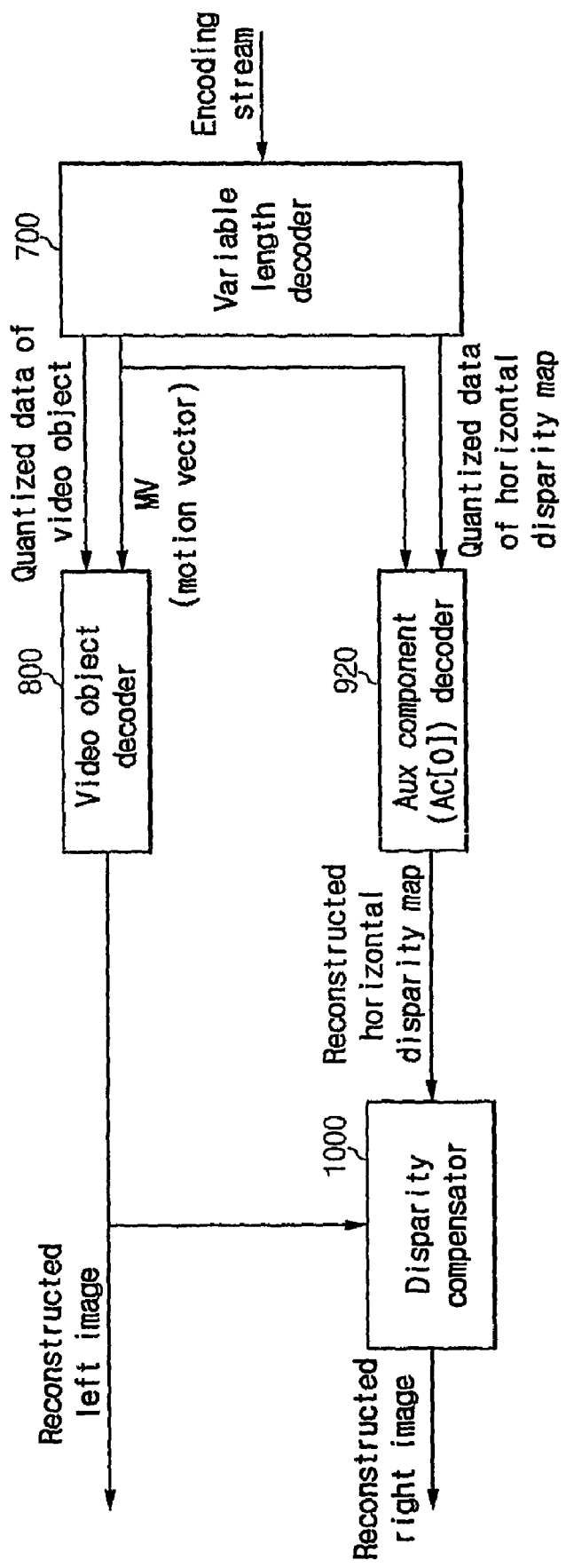
FIG. 3 shows a stereoscopic video decoder according to a first preferred embodiment of the present invention.

FIG. 3 shows a decoder according to a first preferred embodiment of the present invention.

As shown, the decoder comprises a variable length decoder 700, a video object decoder 800, an auxiliary component decoder 920, and a disparity compensator 1000.

The variable length decoder 700 performs variable length decoding on the encoding stream output by the encoder of FIG. 2, and outputs quantized data of the video object, a motion vector, and quantized data of the horizontal disparity map.

The video object decoder 800 receives the quantized data of the video object and the motion vector, and decodes the video object to decode the left image.

The auxiliary component decoder 920 receives the quantized data of the horizontal disparity map and the motion vector, and decodes the horizontal disparity map.

The disparity compensator 1000 receives a reconstructed left image and a reconstructed horizontal disparity map, performs disparity compensation based on a disparity vector of the horizontal disparity map, and finally reconstructs a right image.

As described above, the disparity estimation is a process for searching and estimating to what positions of the left image the pixels of the right image are provided, and position vectors moved to the horizontal axis are output as a horizontal disparity map, while position vectors moved to the vertical axis are output as a vertical disparity map. In general, a disparity map represents the horizontal disparity map because the right and left images of the ideal stereoscopic image only have horizontal disparity values, and all the vertical disparity values are zero.

The encoder and the decoder according to the first preferred embodiment are used for an ideal system which only has horizontal disparity values with the vertical disparity values of 0, and use the predefined MAC.

That is, the encoder and the decoder according to the preferred embodiment use the value of video_object_layer_shape_extension with the conventional auxiliary components including the disparity type of FIG. 1 to allocate the horizontal disparity map to the disparity type auxiliary component and encode the same. In this instance, the disparity map is found for the luminance data from among the luminance data and the chrominance data.

Since the stereoscopic video by computer graphics are ideally generated through a computer, the vertical disparity values can all be set to be zero so as to generate the stereoscopic video. Therefore, the accurate disparity map can be found through the encoder and the decoder according to the first preferred embodiment, and the quality of the right image is guaranteed to some degrees by this information.

However, in the case of real images captured by a stereoscopic camera, the vertical disparity values are provided according to shapes and performance of the actually manufactured stereoscopic camera differing from the images by the computer graphics. In addition, since the accuracy of the disparity map by the horizontal disparity vectors found by calculation is lowered below the accuracy of computer graphics images, the quality of the right image reconstructed only through horizontal disparity information is substantially worsened. Further, since the disparity map according to the first preferred embodiment has no information on an occlusion area which is not provided to the left image but is to the right image, it is difficult to precisely reconstruct the right image.

Accordingly, information on the vertical disparity and residual texture as well as information on the horizontal disparity is added as information on the right image to the MPEG-4 MAC to define video_object_layer_shape_extension having the auxiliary components of FIGS. 4 and 5.

The video_object_layer_shape_extension of FIG. 4 includes values of from 1101 to 1111 which are not defined by the existing MPEG-4 MAC but are newly defined as an auxiliary component in the preferred embodiment of the present invention, and the video_object_layer_shape_extension of FIG. 5 is newly defined in the preferred embodiment of the present invention so as to support four auxiliary components which are not supported by the MPEG-4 MAC.

As shown in FIGS. 4 and 5, disparity information is divided into a horizontal disparity map and a vertical disparity map by the horizontal and vertical disparity values, the residual texture is classified as luminance residual texture and chrominance residual texture information, and auxiliary information is selected according to importance and complexity of images to perform encoding. In this instance, the luminance residual texture information represents data of the left image reconstructed after decoding, the right image disparity-compensated by the reconstructed disparity map, and the residual image by the luminance component of the input right image. The chrominance residual texture information represent data of the left image reconstructed after encoding, the right image disparity-compensated by the reconstructed disparity map, and the residual image by the chrominance component of the input right image.

Figure 6:
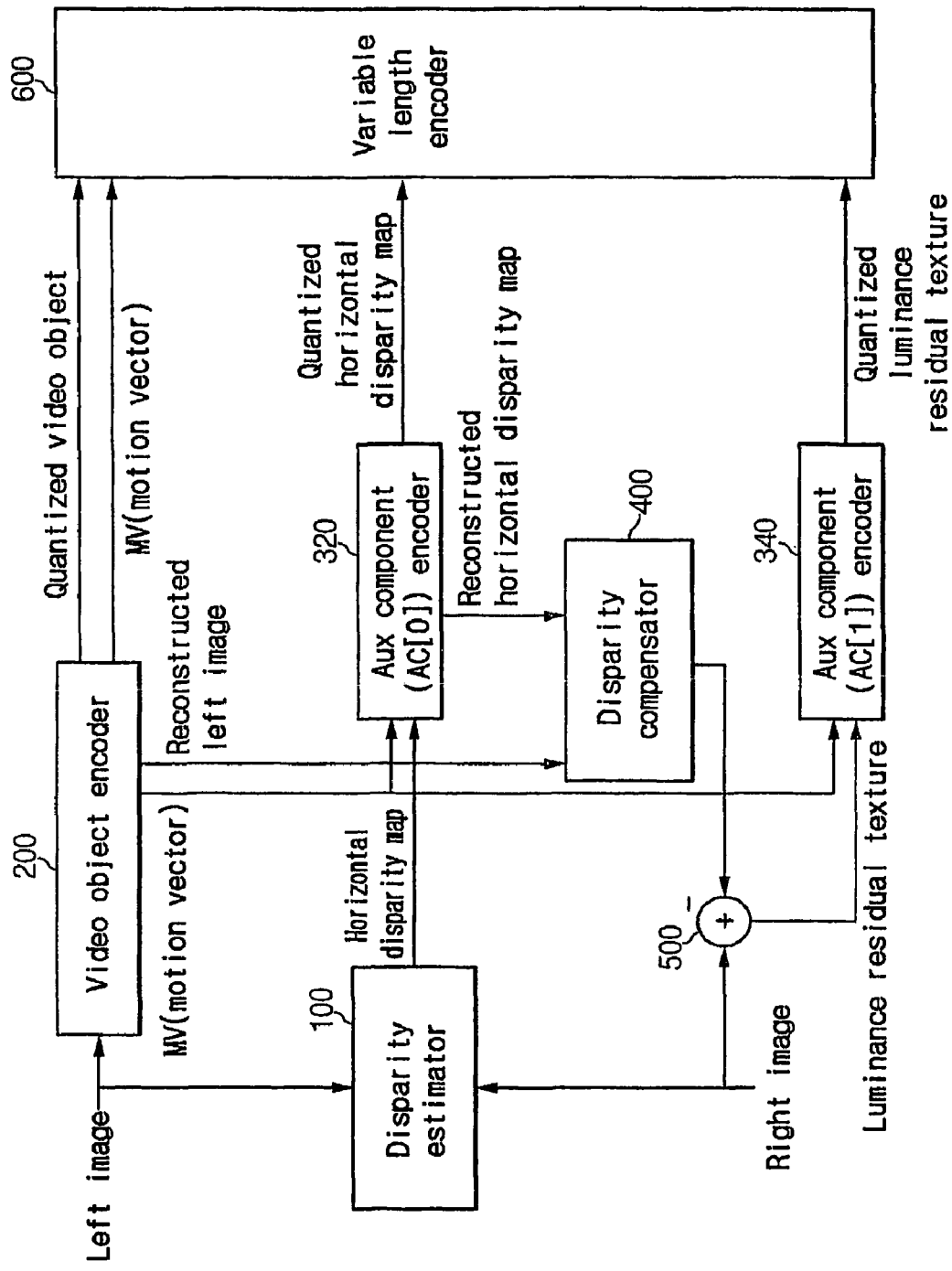
FIG. 6 shows a stereoscopic video encoder according to a second preferred embodiment of the present invention.
Figure 7:
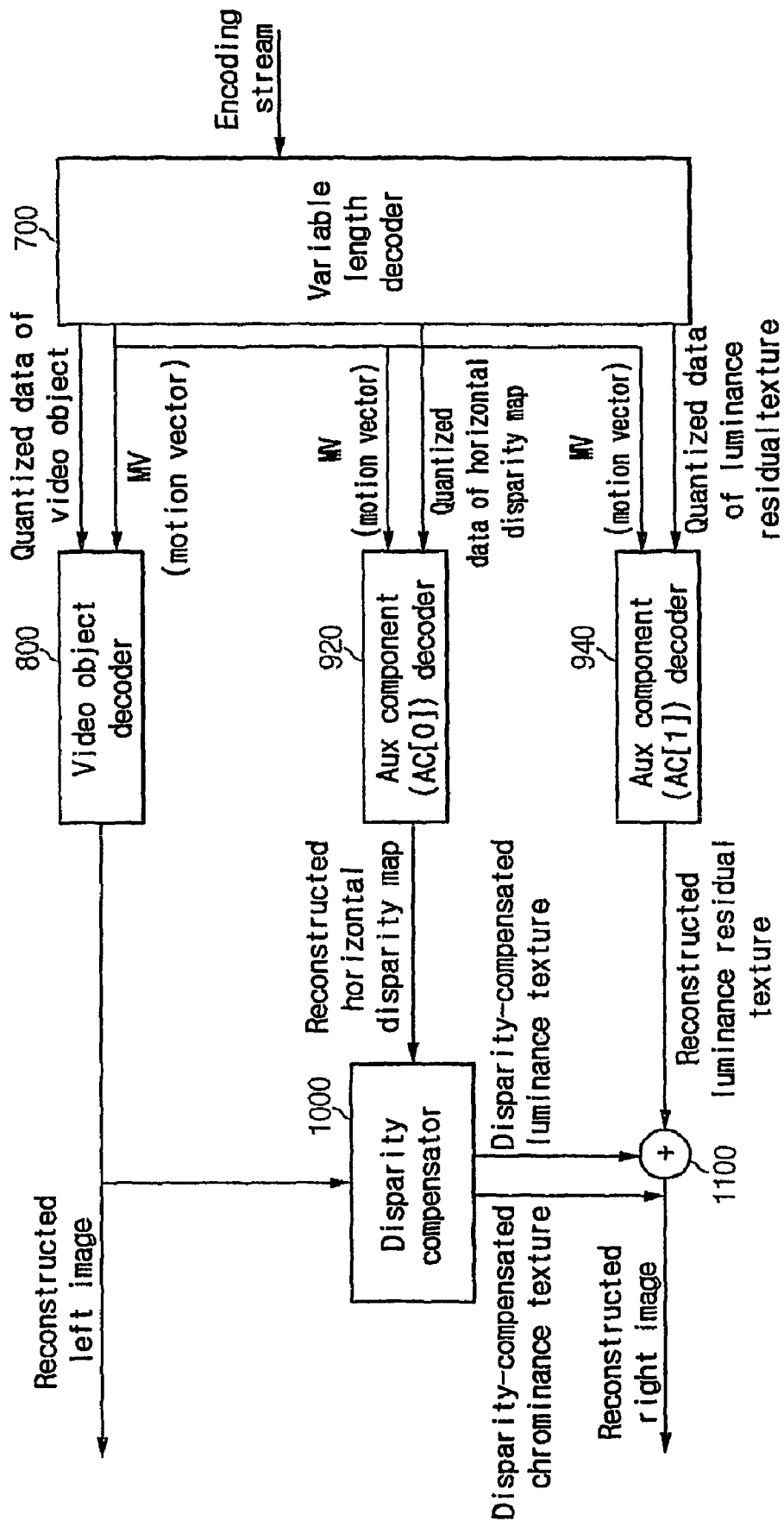
FIG. 7 shows a stereoscopic video decoder according to a second preferred embodiment of the present invention.

FIGS. 6 and 7 respectively show an encoder and a decoder according to a second preferred embodiment of the present invention. The encoder and the decoder establish the video_object_layer_shape_extension which has two auxiliary components of the horizontal disparity type and the luminance residual texture type which are newly defined for encoding the stereoscopic video, and encode and decode the stereoscopic video.

As shown in FIG. 6, the encoder comprises a disparity estimator 100, a video object encoder 200, auxiliary component encoders 320 and 340, a disparity compensator 400, an adder 500, and a variable length encoder 600.

The video object encoder 200 receives one image (a left image in the preferred embodiment) of the stereoscopic video, outputs a quantized video object and a motion vector, and outputs a left image obtained by reconstructing the quantized video object.

The disparity estimator 100 receives left and right images, and finds a pixel-based horizontal disparity map of the right image with reference to the left image.

The auxiliary component encoder 320 receives the horizontal disparity map which is an auxiliary component output by the disparity estimator 100 and the motion vector output by the video object encoder 200, generates a quantized horizontal disparity map, outputs the quantized horizontal disparity map, and outputs a horizontal disparity map obtained by reconstructing the quantized horizontal disparity map.

The disparity compensator 400 performs disparity compensation based on pixel values (luminance) of the reconstructed left image output by the video object encoder 200 and the horizontal disparity vectors of the reconstructed horizontal map output by the auxiliary component encoder 320, and outputs pixel values (luminance) of the compensated right image.

The adder 500 performs a residual process on the pixel value (luminance) of the right image and the pixel value (luminance) of the disparity-compensated right image output by the disparity compensator 400 to output luminance residual texture, and the auxiliary component encoder 340 encodes the luminance residual texture to output quantized luminance residual texture.

The variable length encoder 600 performs variable length encoding on the quantized video object and the motion vector output by the video object encoder 200, the quantized horizontal disparity map output by the auxiliary component encoder 320, and the quantized luminance residual texture output by the auxiliary component encoder 340, and outputs an encoding stream.

FIG. 8 shows an encoding stream output by the encoder according to the second preferred embodiment of the present invention. As shown, the encoding stream output by the encoder (a variable length encoder) includes macro blocks of the encoded video object (the left image), macro blocks of an auxiliary component AC[0] for the encoded horizontal disparity map, and macro blocks of an auxiliary component AC[1] for encoded luminance residual texture.

FIG. 7 shows a decoder according to a second preferred embodiment of the present invention.

As shown, the decoder comprises a variable length decoder 700, a video object decoder 800, auxiliary component decoders 920 and 940, a disparity compensator 1000, and an adder 1100.

The variable length decoder 700 performs variable length decoding on the encoding stream output by the encoder as shown in FIG. 8, and outputs quantized data of the video object, a motion vector, quantized data of the horizontal disparity map, and quantized data of the luminance residual texture.

The video object decoder 800 receives the quantized data of the video object and the motion vector, and decodes the video object to decode the left image.

The auxiliary component decoder 920 receives the quantized data of the horizontal disparity map and the motion vector, and decodes the horizontal disparity map.

The auxiliary component decoder 940 receives the quantized data of the luminance residual texture and the motion vector, and decodes the luminance residual texture.

The disparity compensator 1000 receives a reconstructed left image and a reconstructed horizontal disparity map, and performs disparity compensation based on a disparity vector of the horizontal disparity map.

The adder 1100 adds the disparity-compensated luminance texture from among the disparity-compensated data and the reconstructed luminance residual texture output by the auxiliary component decoder 940 to reconstruct the right image.

In the second preferred embodiment shown in FIGS. 6 and 7, the left image is encoded and decoded as a single video object, and the right image is encoded and decoded using the MAC shown in FIG. 4. That is, the pixel-based horizontal disparity map found with reference to the left image is allocated to aux_comp_type[0], and the luminance residual texture which is residual image data of the luminance component is allocated to aux_comp_type[1] to perform encoding and decoding.

The second preferred embodiment is applicable to simple images which do not greatly influence deterioration of image quality when performing encoding without a vertical disparity map and chrominance residual texture information which is residual image data on the chrominance component, or to images which require no precise reconstruction.

Figure 9:
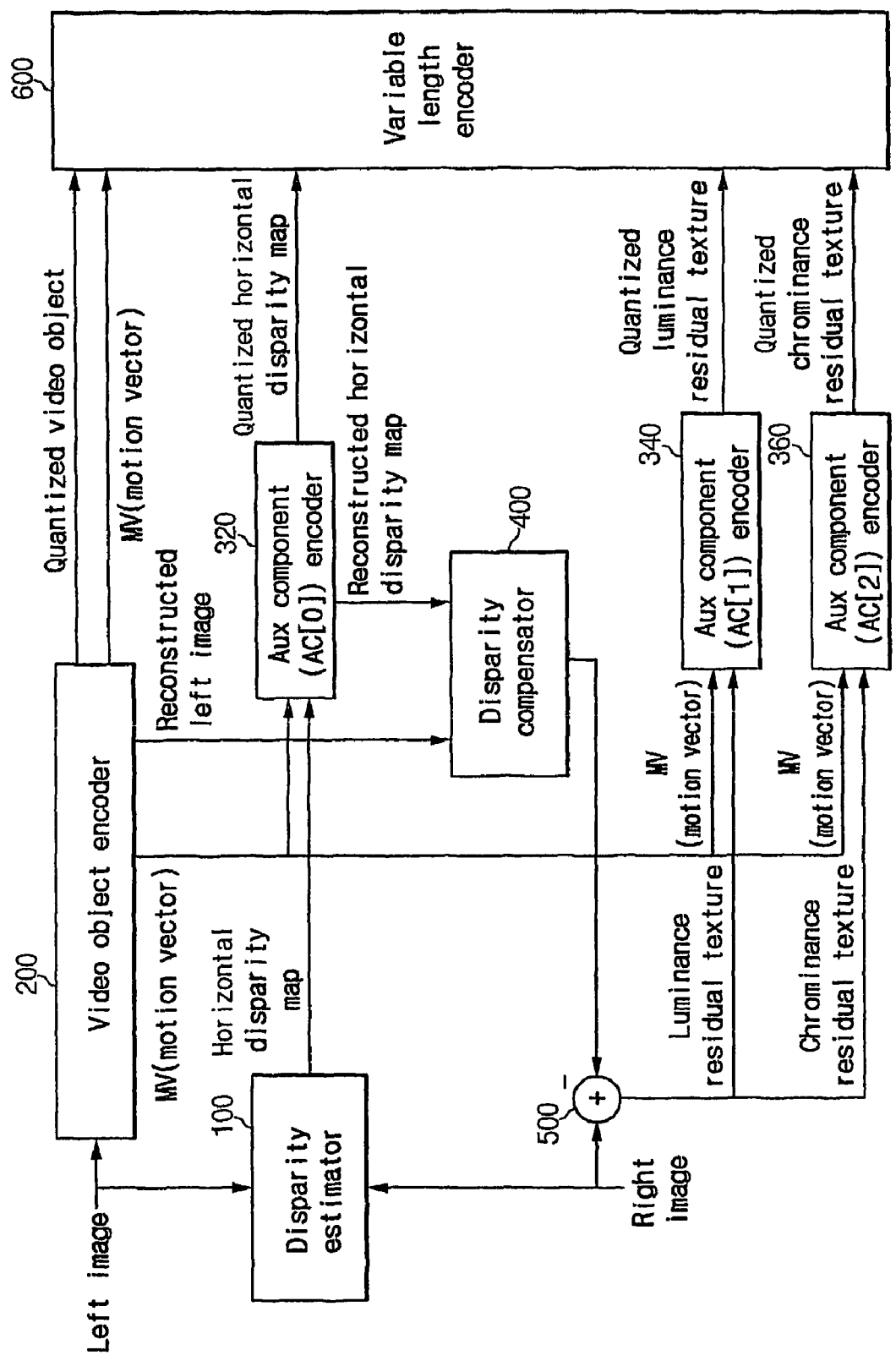
FIG. 9 shows a stereoscopic video encoder according to a third preferred embodiment of the present invention.
Figure 10:
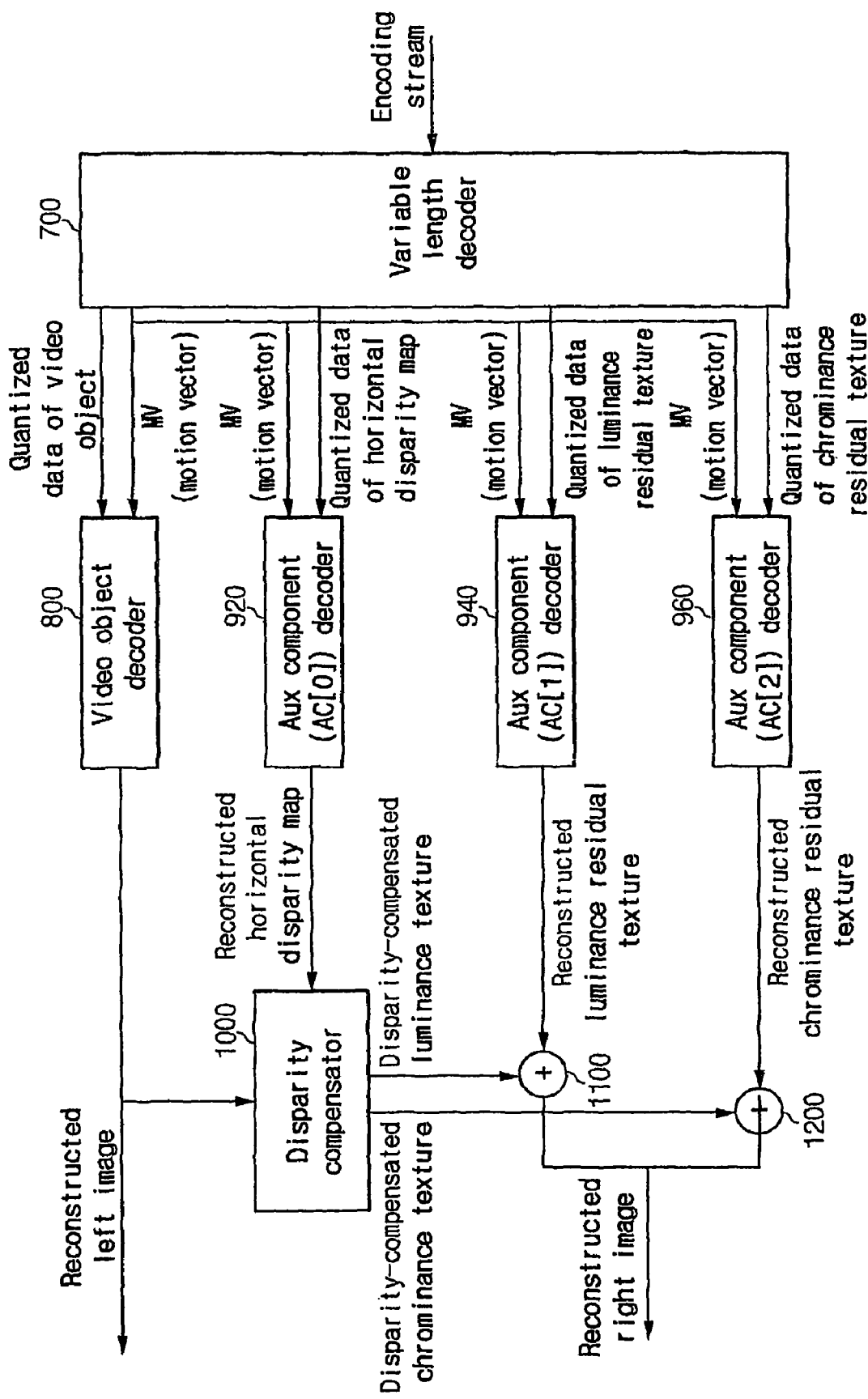
FIG. 10 shows a stereoscopic video decoder according to a third preferred embodiment of the present invention.

FIGS. 9 and 10 respectively show an encoder and a decoder according to a third preferred embodiment of the present invention. The encoder and the decoder establishes the video_object_layer_shape_extension which has three auxiliary components of the horizontal disparity type, the luminance residual texture type, and the chrominance residual texture type which are additionally defined with reference to FIG. 4, and performs encoding and decoding.

That is, the pixel-based horizontal disparity map found with reference to the left image is allocated to aux_comp_type[0], the luminance residual texture is allocated to aux_comp_type[1], and the chrominance residual texture which is residual image data on the chrominance component is allocated to aux_comp_type[2]. The encoder and the decoder are usable for simple images which do not greatly influence deterioration of image quality when performing encoding without a vertical disparity map, or for images which require no precise reconstruction.

As shown in FIG. 9, the encoder according to the third preferred embodiment of the present invention comprises a disparity estimator 100, a video object encoder 200, auxiliary component encoders 320, 340, and 360, a disparity compensator 400, an adder 500, and a variable length encoder 600.

The components of FIG. 9 which perform the same or similar functions as those of the encoder of FIG. 6 have the same reference numerals, and no repeated descriptions on the components of FIG. 9 which execute the same operations as those of the components of FIG. 6 will be provided.

The disparity compensator 400 performs disparity compensation based on pixel values (luminance and chrominance) of the reconstructed left image output by the video object encoder 200 and the horizontal disparity vectors of the reconstructed horizontal map output by the auxiliary component encoder 320, and outputs pixel values (luminance and chrominance) of the compensated right image.

The adder 500 performs a residual process on the pixel values (luminance and chrominance) of the disparity-compensated right image and the pixel values (luminance and chrominance) of the compensated right image output by the disparity compensator 400 to output luminance residual texture and chrominance residual texture, and the auxiliary component encoders 340 and 360 encode the luminance residual texture and the chrominance residual texture to output quantized luminance residual texture and quantized chrominance residual texture.

The variable length encoder 600 performs variable length encoding on the quantized video object and the motion vector output by the video object encoder 200, the quantized horizontal disparity map output by the auxiliary component encoder 320, the quantized luminance residual texture output by the auxiliary component encoder 340, and the quantized chrominance residual texture output by the auxiliary component encoder 360, and outputs an encoding stream.

FIG. 11 shows an encoding stream output by the encoder according to the third preferred embodiment of the present invention. As shown, the encoding stream output by the encoder includes macro blocks of the encoded video object, macro blocks of the auxiliary component AC[0] for the encoded horizontal disparity map, macro blocks of the auxiliary component AC[1] for the encoded luminance residual texture, and macro blocks of the auxiliary component AC[2] for the encoded chrominance residual texture.

FIG. 10 shows a decoder according to the third preferred embodiment of the present invention.

As shown, the decoder comprises a variable length decoder 700, a video object decoder 800, auxiliary component decoders 920, 940, and 960, a disparity compensator 1000, and adders 1100 and 1200.

The components of FIG. 10 which perform the same or similar functions as those of the decoder of FIG. 7 have the same reference numerals, and no repeated descriptions on the components of FIG. 10 which execute the same operations as those of the components of FIG. 7 will be provided.

The variable length decoder 700 performs variable length decoding on the encoding stream output by the encoder and shown in FIG. 11, and outputs quantized data of the video object, a motion vector, quantized data of the horizontal disparity map, quantized data of the luminance residual texture, and quantized data of the chrominance residual texture.

The auxiliary component decoder 940 receives the quantized data of the luminance residual texture and the motion vector, and decodes the luminance residual texture.

The auxiliary component decoder 960 receives the quantized data of the chrominance residual texture and the motion vector, and decodes the chrominance residual texture.

The disparity compensator 1000 receives a reconstructed left image and a reconstructed horizontal disparity map, and performs disparity compensation based on a disparity vector of the horizontal disparity map.

The adder 1100 adds the disparity-compensated luminance texture from among the data disparity-compensated by the disparity compensator 1000 and the reconstructed luminance residual texture output by the auxiliary component decoder 940 to reconstruct the luminance component of the right image.

The adder 1200 adds the disparity-compensated chrominance texture from among the disparity-compensated data and the reconstructed chrominance residual texture output by the auxiliary component decoder 940 to reconstruct the chrominance component of the right image.

Figure 12:
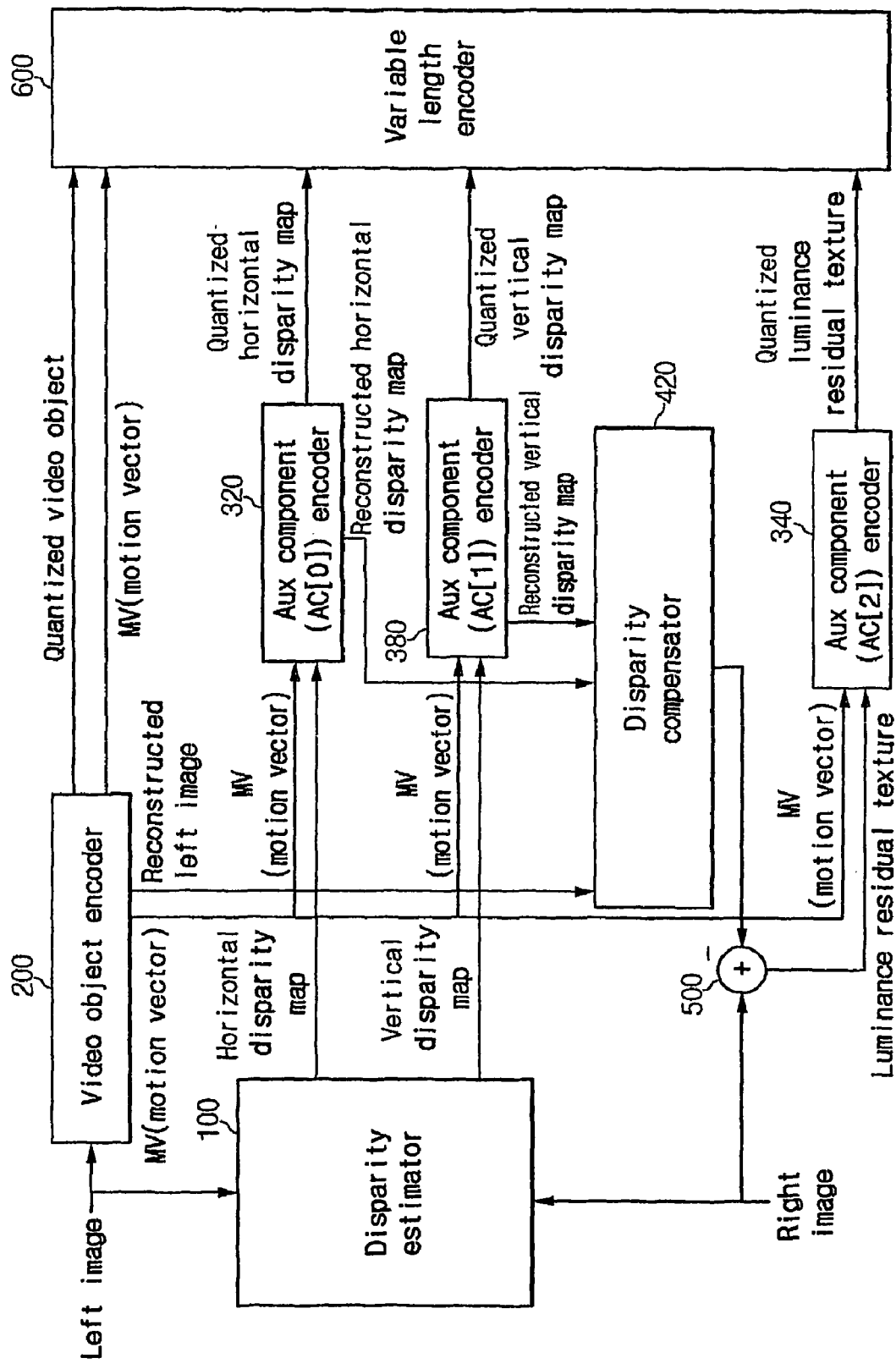
FIG. 12 shows a stereoscopic video encoder according to a fourth preferred embodiment of the present invention.
Figure 13:
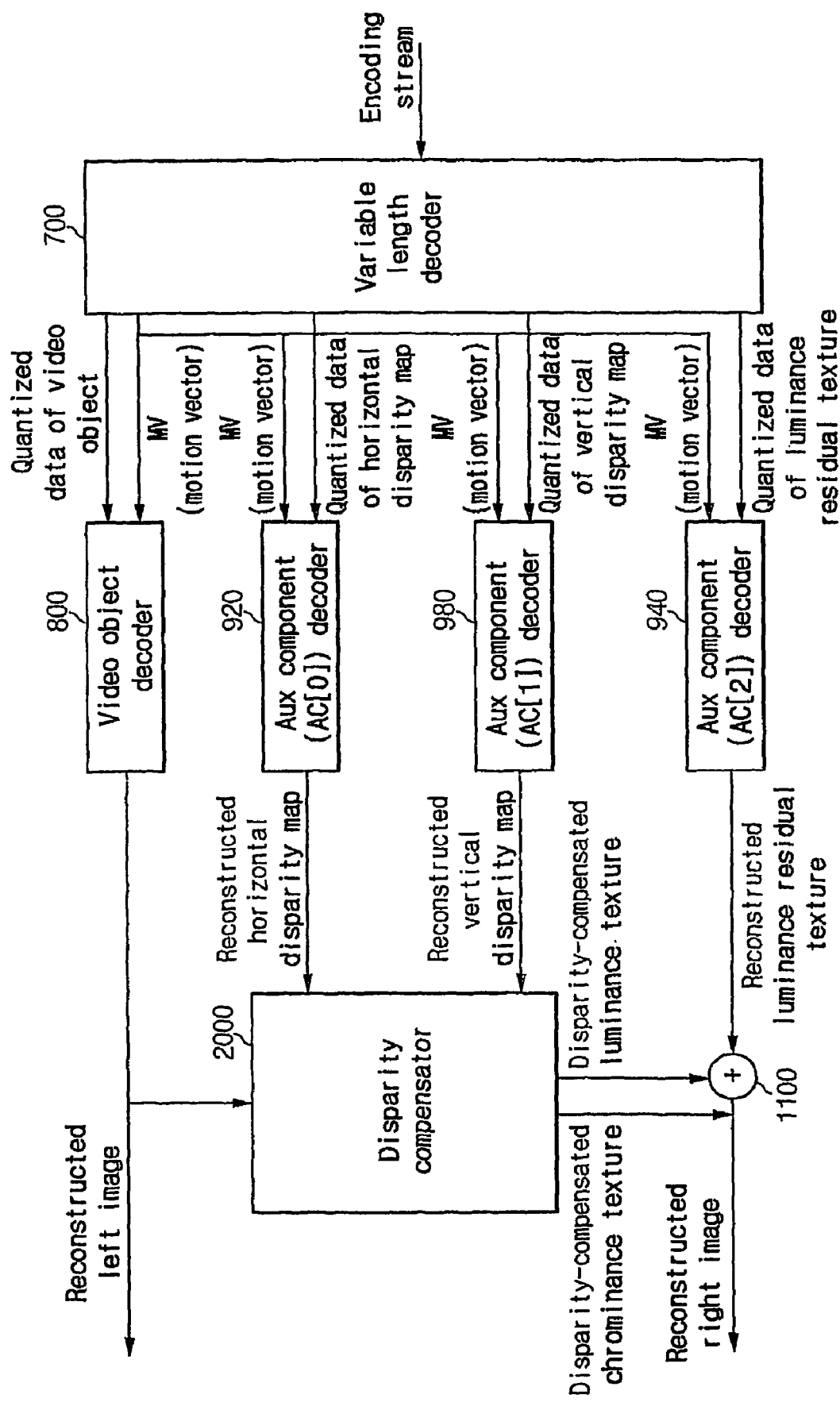
FIG. 13 shows a stereoscopic video decoder according to a fourth preferred embodiment of the present invention.

FIGS. 12 and 13 respectively show an encoder and a decoder according to a fourth preferred embodiment of the present invention. The encoder and the decoder establishes the video_object_layer_shape_extension which has three auxiliary components of the horizontal disparity type, the vertical disparity type, and the luminance residual texture type which are additionally defined with reference to FIG. 4, and performs encoding and decoding.

That is, the pixel-based horizontal disparity map found with reference to the left image is allocated to aux_comp_type[0], the pixel-based vertical disparity map found with reference to the left image is allocated to aux_comp_type[1], and the luminance residual texture which is residual image data on the luminance component is allocated to aux_comp_type[2]. The encoder and the decoder are usable for simple images which do not greatly influence deterioration of image quality when performing encoding without chrominance residual texture information which is residual image data on the chrominance component, or for images which require no precise reconstruction.

As shown in FIG. 12, the encoder according to the fourth preferred embodiment of the present invention comprises a disparity estimator 100, a video object encoder 200, auxiliary component encoders 320, 340, and 380, a disparity compensator 420, an adder 500, and a variable length encoder 600.

The components of FIG. 12 which perform the same or similar functions as those of the encoder of FIG. 6 have the same reference numerals, and no repeated descriptions on the components of FIG. 12 which execute the same operations as those of the components of FIG. 6 will be provided.

The disparity estimator 100 receives left and right images, and finds a pixel-based horizontal disparity map and a vertical disparity map of the right image with reference to the left image.

The auxiliary component encoder 380 receives the vertical disparity map output by the disparity estimator 100 and the motion vector output by the video object encoder 200, generates a quantized vertical disparity map, outputs the quantized vertical disparity map, and outputs a vertical disparity map obtained by reconstructing the quantized vertical disparity map.

The disparity compensator 420 performs disparity compensation based on pixel values (luminance) of the reconstructed left image output by the video object encoder 200, the horizontal disparity vectors of the reconstructed horizontal disparity map output by the auxiliary component encoder 320, and the vertical disparity vectors of the reconstructed vertical disparity map output by the auxiliary component encoder 380, and outputs pixel values (luminance) of the compensated right image.

The adder 500 performs a residual process on the pixel value (luminance) of the right image and the pixel value (luminance) of the disparity-compensated right image output by the disparity compensator 420 to output luminance residual texture, and the auxiliary component encoder 340 encodes the luminance residual texture to output quantized luminance residual texture.

The variable length encoder 600 performs variable length encoding on the quantized video object and the motion vector output by the video object encoder 200, the quantized horizontal disparity map output by the auxiliary component encoder 320, the quantized vertical disparity map output by the auxiliary component encoder 380, and the quantized luminance residual texture output by the auxiliary component encoder 360, and outputs an encoding stream.

Figure 14:
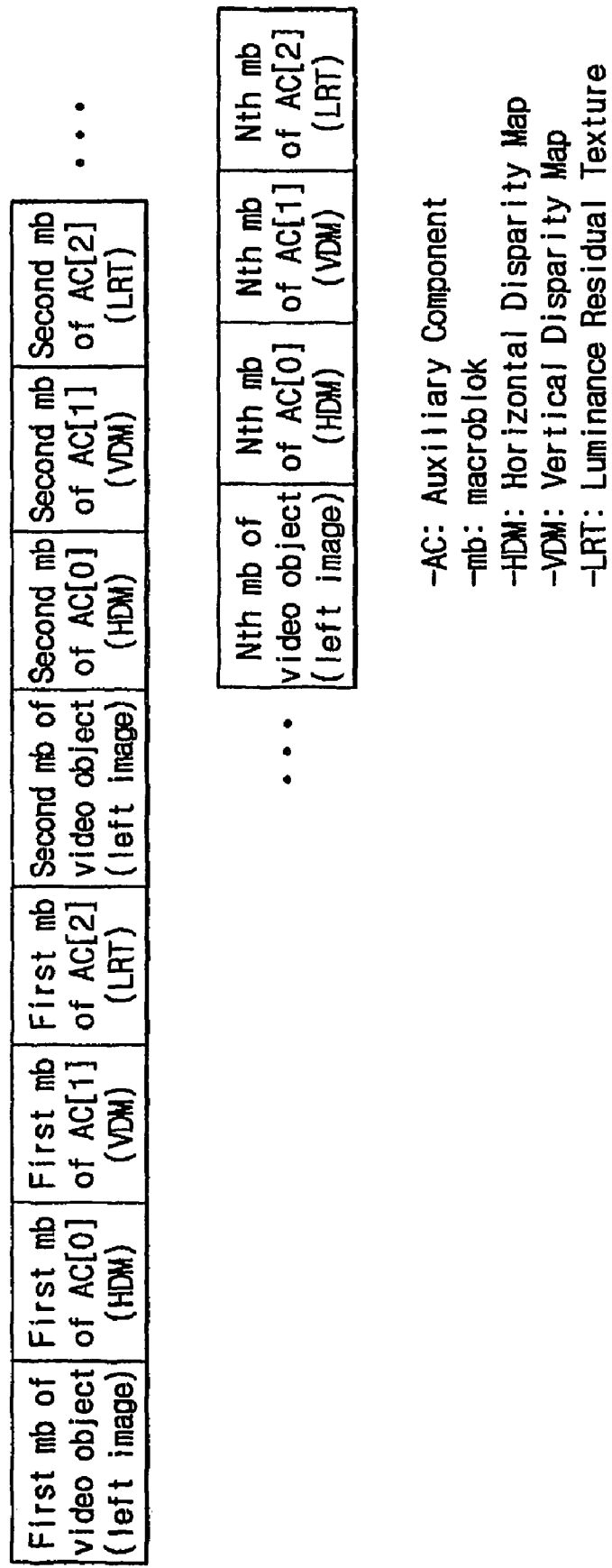
FIG. 14 shows an encoding stream output by the encoder according to a fourth preferred embodiment of the present invention.

FIG. 14 shows an encoding stream output by the encoder according to the fourth preferred embodiment of the present invention. As shown, the encoding stream output by the encoder includes macro blocks of the encoded video object, macro blocks of the auxiliary component AC[0] for the encoded horizontal disparity map, macro blocks of the auxiliary component AC[1] for the encoded vertical disparity map, and macro blocks of the auxiliary component AC[2] for encoded luminance residual texture.

FIG. 13 shows a decoder according to the fourth preferred embodiment of the present invention.

As shown, the decoder comprises a variable length decoder 700, a video object decoder 800, auxiliary component decoders 920, 940, and 980, a disparity compensator 2000, and an adder 1100.

The components of FIG. 13 which perform the same or similar functions as those of the decoder of FIG. 7 have the same reference numerals, and no repeated descriptions on the components of FIG. 13 which execute the same operations as those of the components of FIG. 7 will be provided.

The variable length decoder 700 performs variable length decoding on the encoding stream output by the encoder as shown in FIG. 14, and outputs quantized data of the video object, a motion vector, quantized data of the horizontal disparity map, quantized data of the vertical disparity map, and quantized data of the luminance residual texture.

The auxiliary component decoder 980 receives the quantized data of the vertical disparity map and the motion vector, and decodes the vertical disparity map.

The disparity compensator 2000 receives a reconstructed left image, a reconstructed horizontal disparity map, and a reconstructed vertical disparity map, and performs disparity compensation based on disparity vectors of the horizontal disparity map and the vertical disparity map.

The adder 1100 adds the disparity-compensated luminance texture from among the data disparity-compensated by the disparity compensator 2000 and the reconstructed luminance residual texture output by the auxiliary component decoder 940 to reconstruct the luminance component of the right image.

Figure 15:
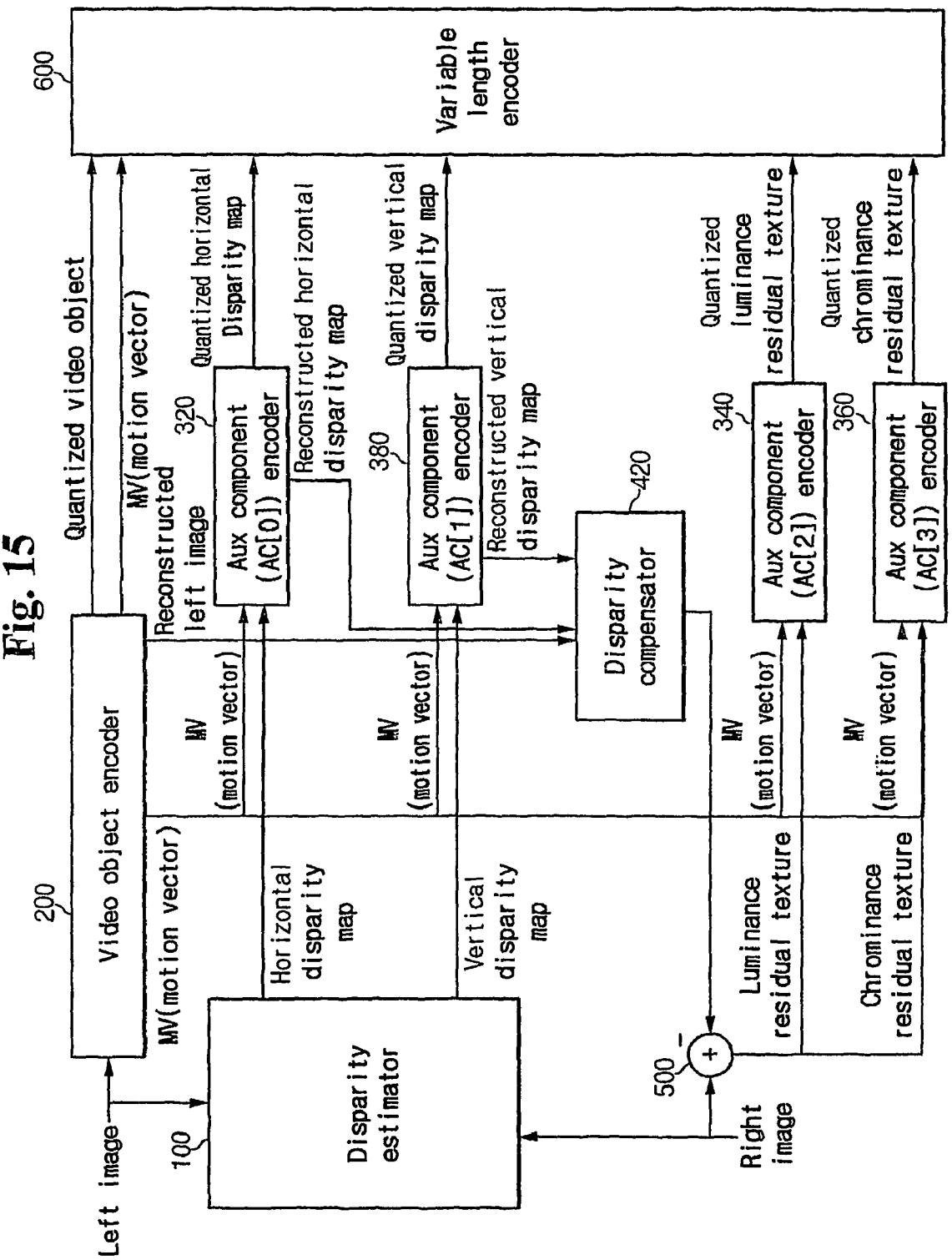
FIG. 15 shows a stereoscopic video encoder according to a fifth preferred embodiment of the present invention.
Figure 16:
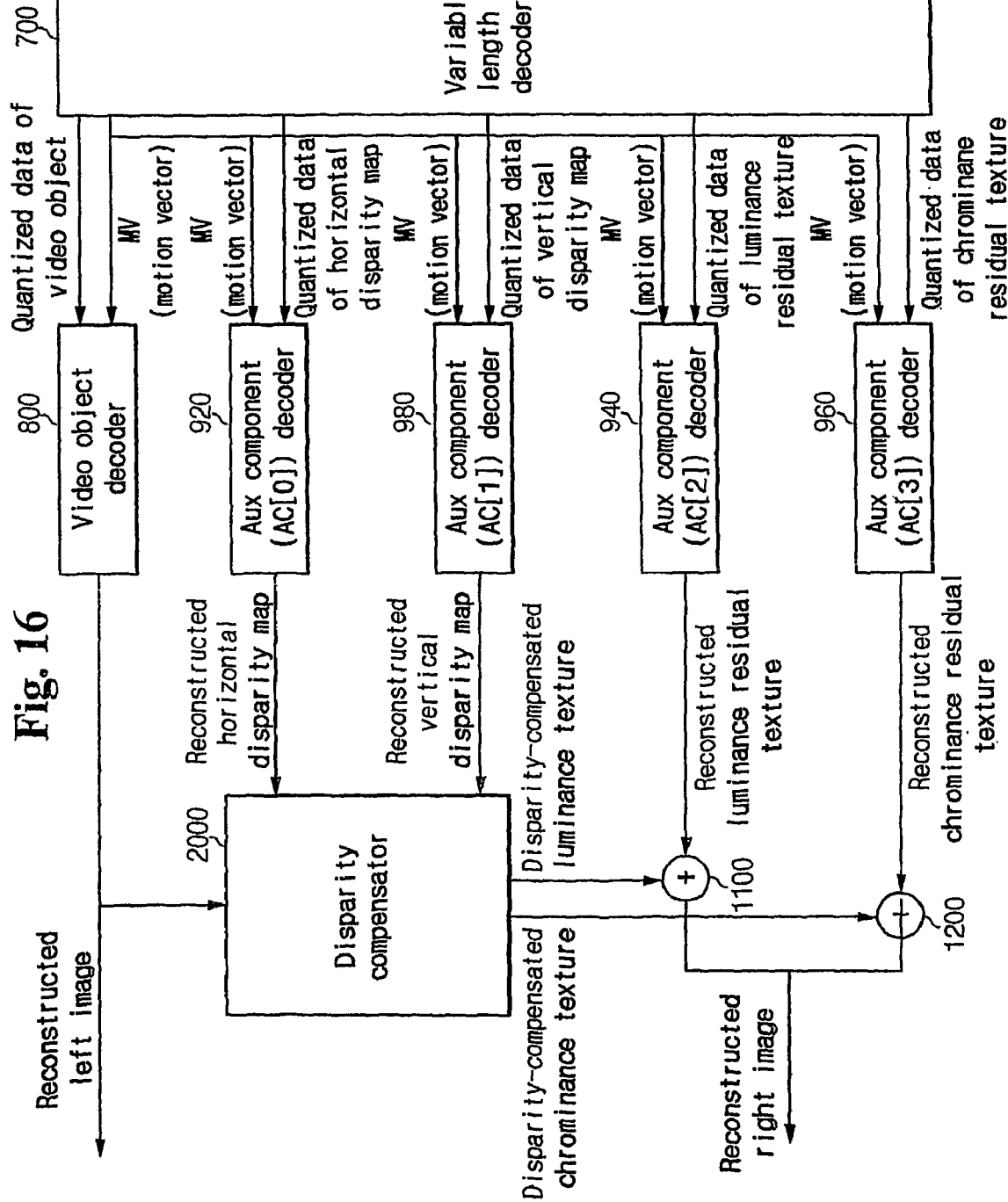
FIG. 16 shows a stereoscopic video decoder according to a fifth preferred embodiment of the present invention.

FIGS. 15 and 16 respectively show an encoder and a decoder according to a fifth preferred embodiment of the present invention. The encoder and the decoder establish the video_object_layer_shape_extension which has four auxiliary components of the horizontal disparity type, the vertical disparity type, the luminance residual texture type, and the chrominance residual texture type which are additionally defined when the number of auxiliary components of the MAC is increased to equal to or more than four as shown in FIG. 5, and performs encoding and decoding.

That is, the encoder and the decoder allocates the pixel-based horizontal disparity map found with reference to the left image to aux_comp_type[0], the pixel-based vertical disparity map found with reference to the left image to aux_comp_type[1], the luminance residual texture which is residual image data on the luminance component to aux_comp_type[2], and the chrominance residual texture which is residual image data on the chrominance component to aux_comp_type[3] to perform encoding and decoding.

The above-described fifth preferred embodiment can, be applicable to the case of reconstructing high-quality images by using all kinds of auxiliary information on the right image.

As shown in FIG. 15, the encoder according to the fifth preferred embodiment of the present invention comprises a disparity estimator 100, a video object encoder 200, auxiliary component encoders 320, 340, 360, and 380, a disparity compensator 420, an adder 500, and a variable length encoder 600.

The components of FIG. 15 which perform the same or similar functions as those of the encoder of FIG. 12 have the same reference numerals, and no repeated descriptions on the components of FIG. 15 which execute the same operations as those of the components of FIG. 12 will be provided.

The disparity estimator 100 receives left and right images, and finds a pixel-based horizontal disparity map and a vertical disparity map of the right image with reference to the left image.

The auxiliary component encoder 380 receives the vertical disparity map output by the disparity estimator 100 and the motion vector output by the video object encoder 200, generates a quantized vertical disparity map, outputs the quantized vertical disparity map, and outputs a vertical disparity map obtained by reconstructing the quantized vertical disparity map.

The disparity compensator 420 performs disparity compensation based on pixel values (luminance and chrominance) of the reconstructed left image output by the video object encoder 200, the horizontal disparity vectors of the reconstructed horizontal disparity map output by the auxiliary component encoder 320, and the vertical disparity vectors of the reconstructed vertical disparity map output by the auxiliary component encoder 380, and outputs pixel values (luminance and chrominance) of the compensated right image.

The adder 500 performs a residual process on the pixel values (luminance and chrominance) of the right image and the pixel values (luminance and chrominance) of the disparity-compensated right image output by the disparity compensator 420 to output luminance residual texture and chrominance residual texture, and the auxiliary component encoder 340 and the auxiliary component encoder 360 respectively encode the luminance residual texture and the chrominance residual texture to output quantized luminance residual texture and quantized chrominance residual texture.

The variable length encoder 600 performs variable length encoding on the quantized video object and the motion vector output by the video object encoder 200, the quantized horizontal disparity map output by the auxiliary component encoder 320, the quantized vertical disparity map output by the auxiliary component encoder 380, the quantized luminance residual texture output by the auxiliary component encoder 340, and the quantized chrominance residual texture output by the auxiliary component encoder 360, and outputs an encoding stream.

Figure 17:
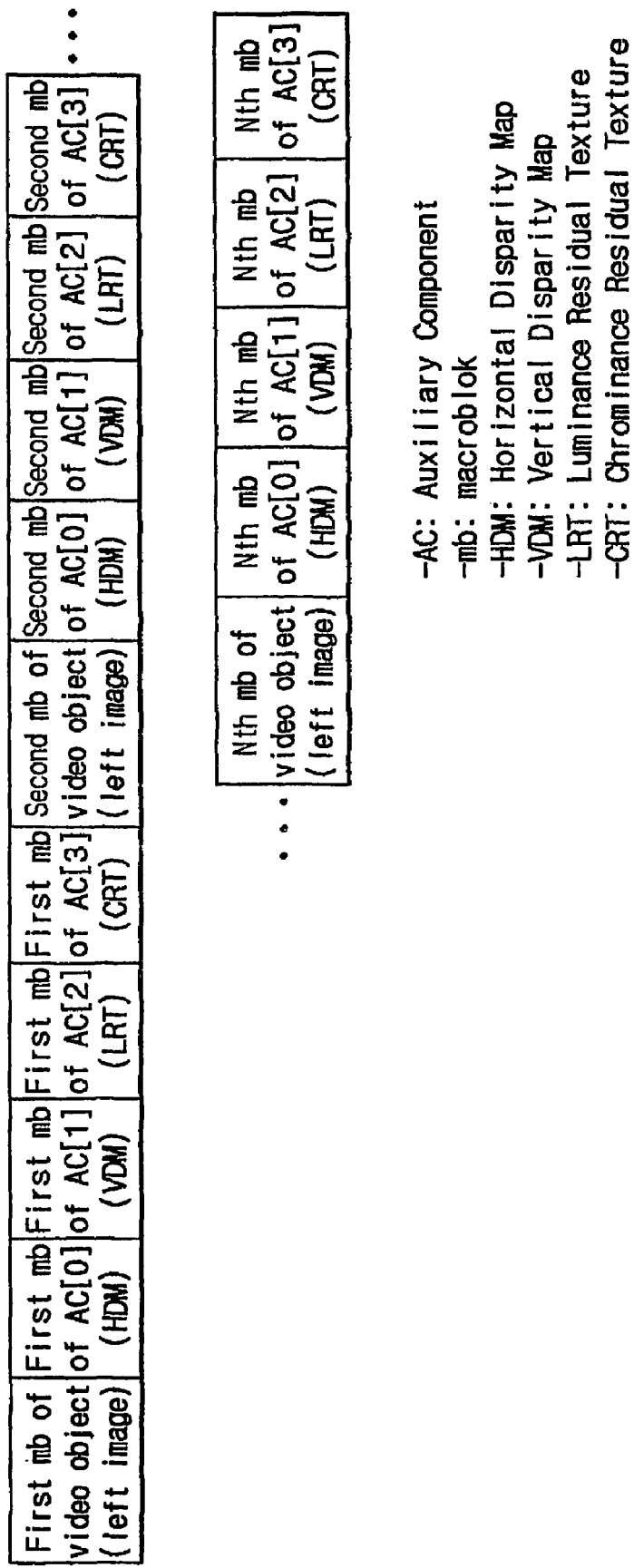
FIG. 17 shows an encoding stream output by the encoder according to a fifth preferred embodiment of the present invention.

FIG. 17 shows an encoding stream output by the encoder according to the fifth preferred embodiment of the present invention. As shown, the encoding stream output by the encoder includes macro blocks of the encoded video object, macro blocks of the auxiliary component AC[0] for the encoded horizontal disparity map, macro blocks of the auxiliary component AC[1] for the encoded vertical disparity map, macro blocks of the auxiliary component AC[2] for the encoded luminance residual texture, and macro blocks of the auxiliary component AC[3] for the encoded chrominance residual texture.

FIG. 16 shows a decoder according to the fifth preferred embodiment of the present invention.

As shown, the decoder comprises a variable length decoder 700, a video object decoder 800, auxiliary component decoders 920, 940, 960, and 980, a disparity compensator 2000, and adders 1100 and 1200.

The components of FIG. 16 which perform the same or similar functions as those of the decoder of FIG. 13 have the same reference numerals, and no repeated descriptions on the components of FIG. 16 which execute the same operations as those of the components of FIG. 13 will be provided.

The variable length decoder 700 performs variable length decoding on the encoding stream output by the encoder and shown in FIG. 17, and outputs quantized data of the video object, a motion vector, quantized data of the horizontal disparity map, quantized data of the vertical disparity map, quantized data of the luminance residual texture, and quantized data of the chrominance residual texture.

The disparity compensator 2000 receives a reconstructed left image, a reconstructed horizontal disparity map, and a reconstructed vertical disparity map, and performs disparity compensation based on disparity vectors of the horizontal disparity map and the vertical disparity map.

The adder 1100 adds the disparity-compensated luminance texture from among the data disparity-compensated by the disparity compensator 2000 and the reconstructed luminance residual texture output by the auxiliary component decoder 940 to reconstruct the luminance component of the right image.

The adder 1200 adds the disparity-compensated chrominance texture from among the data disparity-compensated by the disparity compensator 2000 and the reconstructed chrominance residual texture output by the auxiliary component decoder 960 to reconstruct the chrominance component of the right image.

The video object encoders 200, the auxiliary component encoders 320, 340, 360, and 380, the video object decoder 800, and the auxiliary component decoders 920, 940, 960, and 980 will now be described in further detail.

Figure 18:
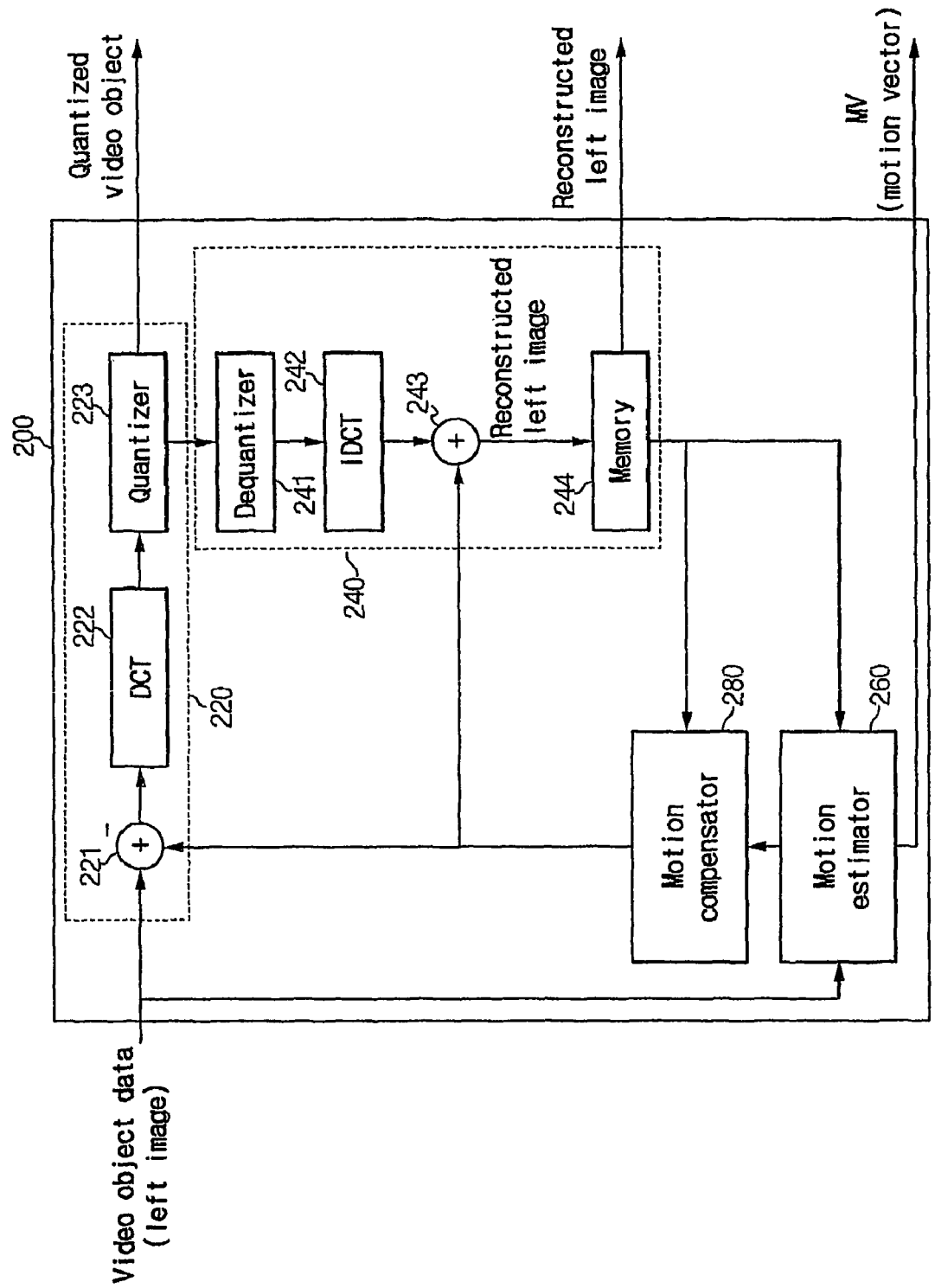
FIG. 18 shows a detailed block diagram for a video object encoder according to a preferred embodiment of the present invention.

FIG. 18 shows a detailed block diagram for the video object encoder 200 according to the preferred embodiments of the present invention.

As shown, the video object encoder 200 comprises an encoding unit 220, a decoding unit 240, a motion estimator 260, and a motion compensator 280.

The encoding unit 220 performs a discrete cosine transform on the video object data (left image) and the motion-compensated data having undergone the residual process, quantizes the discrete-cosine-transformed data, and outputs the quantized video object. The encoding unit 220 comprises an adder 221 for performing a residual process on the video object data and the motion-compensated data, a DCT (discrete cosine transformer) 222 for performing a discrete cosine transform on the residual data output by the adder 221, and a quantizer 223 for quantizing the data output by the DCT 222.

The decoding unit 240 dequantizes the quantized video object output by the encoding unit 220, and performs an inverse discrete cosine transform on the de-quantized data to reconstruct the video object data. The decoding unit 240 comprises a dequantizer 241 for dequantizing the quantized video object output by the encoding unit 220, an IDCT (inverse discrete cosine transformer) 242 for performing an inverse discrete cosine transform on the data output by the dequantizer 241, an adder 243 for adding the video object output by the IDCT 242 and the motion-compensated data to reconstruct the video object data, and a memory 244 for storing the reconstructed left image output by the adder 243.

The motion estimator 260 compares the video object data (left image) with the reconstructed left image of a previous frame stored in the memory 244 to output a motion vector MV.

The motion compensator 280 compares the motion vector output by the motion estimator 260 with the left image of a previous frame stored in the memory 244 to output motion compensation data.

Figure 19:
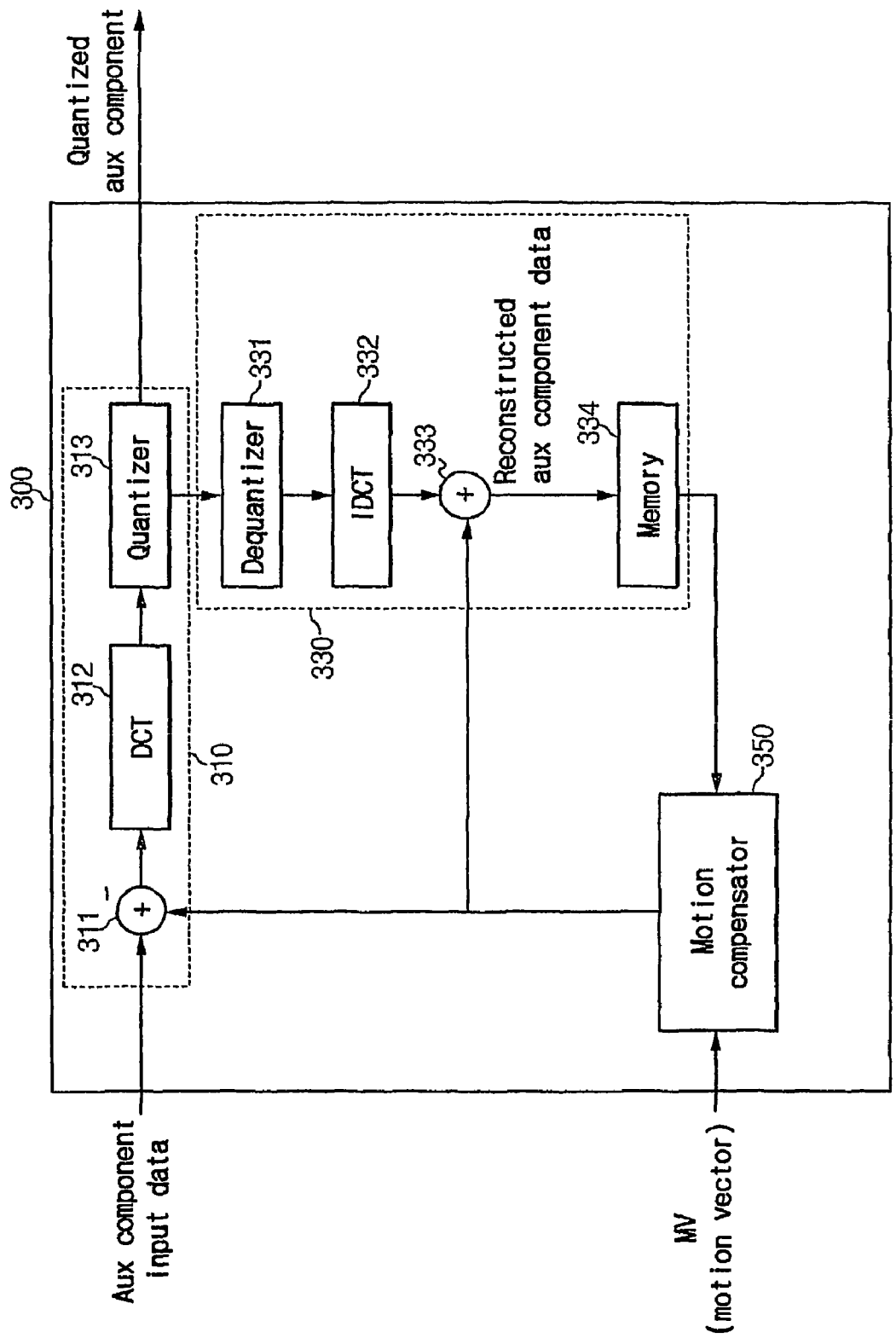
FIG. 19 shows a detailed block diagram for an auxiliary component encoder according to a preferred embodiment of the present invention.

FIG. 19 shows a detailed block diagram for the auxiliary component encoder 300 according to the preferred embodiments of the present invention.

As shown, the auxiliary component encoder 300 comprises an encoding unit 310, a decoding unit 330, and a motion compensator 350.

The encoding unit 310 performs a discrete cosine transform on the auxiliary component data and the motion-compensated data having undergone the residual process, quantizes the discrete-cosine-transformed data, and outputs the quantized auxiliary component data. The encoding unit 310 comprises an adder 311 for performing a residual process on the auxiliary component data and the motion-compensated data, a DCT (discrete cosine transformer) 312 for performing a discrete cosine transform on the residual data output by the adder 311, and a quantizer 313 for quantizing the data output by the DCT 312.

The decoding unit 330 dequantizes the quantized auxiliary component data output by the encoding unit 310, and performs an inverse discrete cosine transform on the de-quantized data to reconstruct the auxiliary component data. The decoding unit 330 comprises a dequantizer 331 for dequantizing the quantized auxiliary component data output by the encoding unit 310, an IDCT (inverse discrete cosine transformer) 332 for performing an inverse discrete cosine transform on the data output by the dequantizer 331, an adder 333 for adding the auxiliary component data output by the IDCT 332 and the motion-compensated data to reconstruct the auxiliary component data, and a memory 334 for storing the reconstructed auxiliary component data output by the adder 333.

The motion compensator 350 compares the motion vector output by the motion estimator 260 of the video object encoder 200 with the auxiliary component data of a previous frame stored in the memory 334 to output motion compensation data on the auxiliary component.

Figure 20:
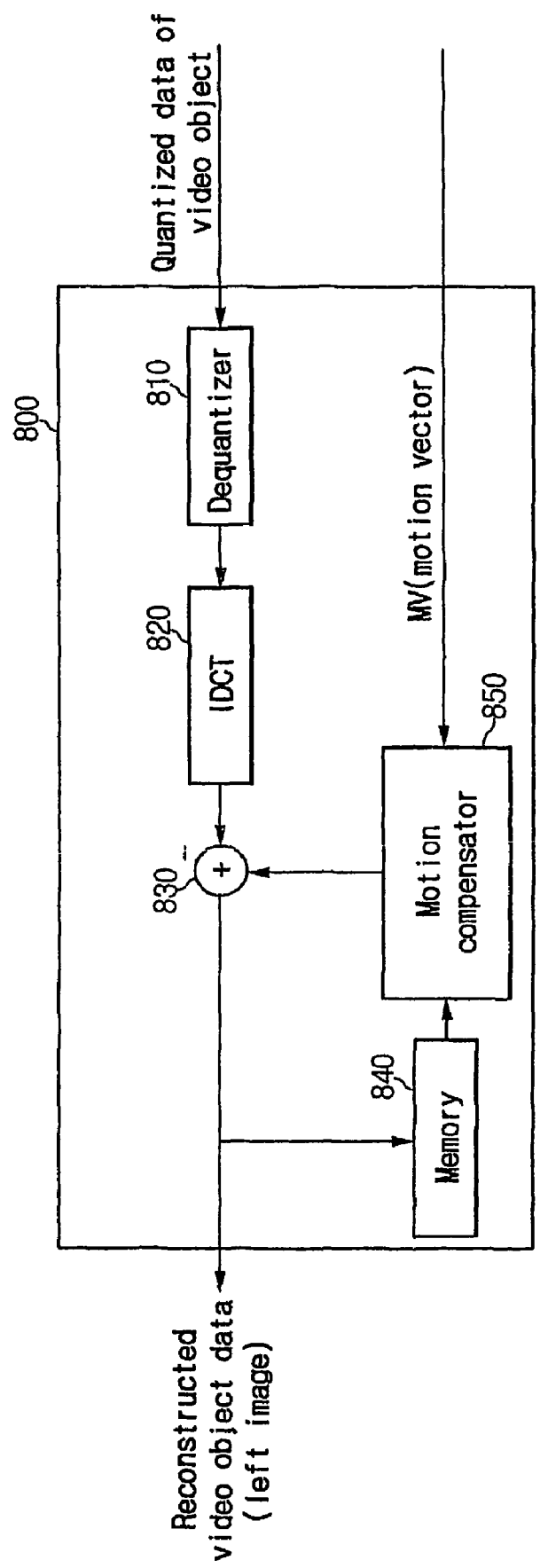
FIG. 20 shows a detailed block diagram for a video object decoder according to a preferred embodiment of the present invention.

FIG. 20 shows a detailed block diagram for the video object decoder 800 according to the preferred embodiments of the present invention.

As shown, the video object decoder 800 comprises a dequantizer 810, an IDCT 820, an adder 830, a motion compensator 850, and a memory 840.

The dequantizer 810 dequantizes the quantized data of the video object output by the variable length decoder, the IDCT 820 performs an inverse discrete cosine transform on the data output by the dequantizer 810, and the motion compensator 850 compares the reconstructed video object data of a previous frame stored in the memory 840 with the motion vector to compensate for motion, and outputs compensated motion vector data.

The adder 830 adds the video object output by the IDCT 820 and the motion-compensated vector data output by the motion compensator 850 to output reconstructed video object data.

Figure 21:
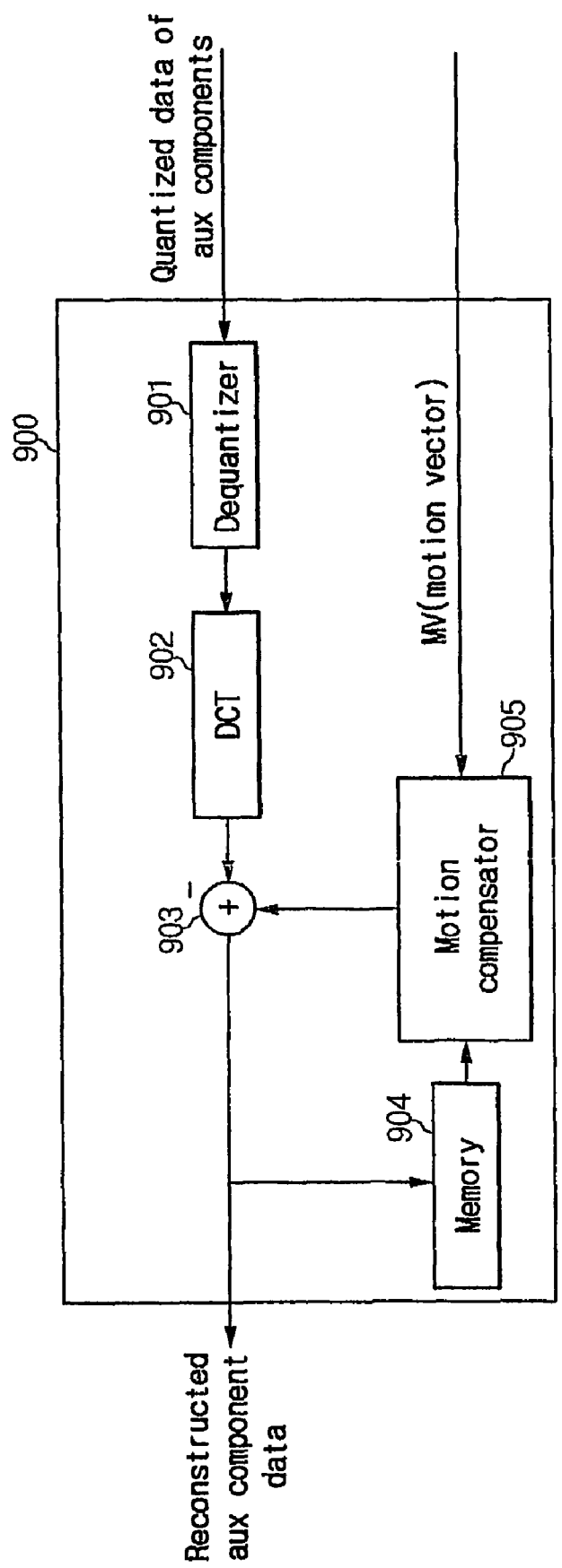
FIG. 21 shows a detailed block diagram for an auxiliary component decoder according to a preferred embodiment of the present invention.

FIG. 21 shows a detailed block diagram for the auxiliary component decoder 900 according to the preferred embodiments of the present invention.

As shown, the auxiliary component decoder 900 comprises a dequantizer 901, an IDCT 902, an adder 903, a motion compensator 905, and a memory 904.

The dequantizer 901 dequantizes the quantized data of the auxiliary component output by the variable length decoder, the IDCT 902 performs an inverse discrete cosine transform on the data output by the dequantizer 901, and the motion compensator 905 compares the reconstructed auxiliary component data of a previous frame stored in the memory 904 with the motion vector to compensate for motion, and outputs compensated motion vector data.

The adder 903 adds the auxiliary component data output by the IDCT 902 and the motion-compensated vector data output by the motion compensator 905 to output reconstructed video object data.

As described, compatibility for using the current MPEG-4 encoding techniques and systems is provided since the stereoscopic video are encoded by using the MAC of the MPEG-4 standard according to the preferred embodiments of the present invention.

Also, synchronization of between the right and left images is simply performed since the encoding streams of the right and left images are output as a single encoding stream.

Further, encoding efficiencies are improved by allocating four components of auxiliary information of the right image to the MAC in various ways, selecting thereof according to image quality levels desired by a user or a producer, and encoding the same.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

For example, the auxiliary information is allocated using the MAC defined by the MPEG-4 standard, and in addition, information defined by other protocols can be used.

As described, compatibility for using the existing MPEG-4 encoding techniques and systems is maintained, and complexity of synchronization of between the right and left images is minimized.

In addition, encoding efficiency is improved by selectively controlling the image quality and encoding it according to importance and complexity of the images.

What is claimed is:

1. A method for encoding stereoscopic video including first and second images, comprising:
(a) encoding the first image, and outputting a quantized video object and a motion vector of the first image;
(b) receiving the first and second images, and finding a pixel-based horizontal disparity map on the second image with reference to the first image; and
(c) encoding the horizontal disparity map and outputting a quantized horizontal disparity map based on the pixel-based horizontal disparity map and a motion vector; and
(d) performing variable length encoding on the quantized video object, the motion vector, and the quantized horizontal disparity map, and outputting the quantized video object, the motion vector, and the quantized horizontal disparity map on which the variable length coding is performed as a single stream.

2. The method of claim 1, wherein the quantized horizontal disparity map is allocated to an auxiliary component of a disparity type of the MPEG-4 MAC (multiple auxiliary component) and is encoded.

3. The method of claim 1, wherein the first image is a left image, and the second image is a right image.

4. A method for decoding stereoscopic video including first and second images, comprising:
(a) receiving an encoding stream, and outputting quantized data of a video object of the first image, a motion vector, and quantized data of a horizontal disparity map by performing variable length decoding on said encoding stream:
(b) decoding the video object and reconstructing the first image based on the quantized data of the video object and the motion vector;
(c) decoding the quantized data of the horizontal disparity map based on the quantized data of the horizontal disparity map and the motion vector; and
(d) performing disparity compensation based on the reconstructed first image and the decoded horizontal disparity map, and reconstructing the second image.

5. The method of claim 4, wherein the first image is a left image, and the second image is a right image.

6. A method for encoding stereoscopic video including first and second images, comprising:
(a) encoding the first image, and outputting a quantized video object and a motion vector of the first image;
(b) decoding the quantized video object output in (a), and reconstructing the first image;
(c) receiving the first and second images, and finding a pixel-based horizontal disparity map on the second image with reference to the first image;
(d) encoding the horizontal disparity map and outputting a quantized horizontal disparity map based on the pixel-based horizontal disparity map and the motion vector;
(e) reconstructing the quantized horizontal disparity map output in (d), and outputting a reconstructed horizontal disparity map;
(f) performing disparity compensation and outputting a pixel value of a disparity-compensated second image based on a pixel value of the first image reconstructed in (b) and a horizontal disparity vector value of the horizontal disparity map reconstructed in (e); and
(g) performing a residual process on the pixel value of the second image and the pixel value of the disparity-compensated second image output in (f) to output luminance residual texture, and encoding the luminance residual to output quantized luminance residual texture; and (h) performing variable length encoding on the quantized video object, the motion vector, the quantized horizontal disparity map, and the quantized luminance residual texture, and outputting the quantized video object, the motion vector, the quantized horizontal disparity map, and the quantized luminance residual texture on which the variable length coding is performed as a single stream.

7. The method of claim 6, wherein the quantized horizontal disparity map and the quantized luminance residual texture are allocated to the MPEG-4 MAC and then encoded.

8. The method of claim 6, wherein the first image is a left image, and the second image is a right image.

9. The method of claim 6, further comprising (h) performing a residual process on the pixel value of the second image and the pixel value of the disparity-compensated second image output in (f) to output chrominance residual texture, and encoding the chrominance residual texture to output quantized chrominance residual texture.

10. The method of claim 9, further comprising (i) performing variable length encoding on the quantized video object, the motion vector, the quantized horizontal disparity map, the quantized luminance residual texture, and the quantized chrominance residual texture, and outputting the quantized video object, the motion vector, the quantized horizontal disparity map, the quantized luminance residual texture, and the quantized chrominance residual texture on which the variable length encoding is performed as a single stream.

11. The method of claim 9, wherein the quantized horizontal disparity map, the quantized luminance residual texture, and the quantized chrominance residual texture are allocated to the MPEG-4 MAC and then encoded.

12. A method for decoding stereoscopic video including first and second images, comprising:
   (a) receiving an encoding stream, and outputting quantized data of a video object of the first image, a motion vector, quantized data of a horizontal disparity map, and quantized data of luminance residual texture by performing variable length decoding on said encoding stream.
   (b) decoding the video object and reconstructing the first image based on the quantized data of the video object and the motion vector;
   (c) decoding the quantized data of the horizontal disparity map based on the quantized data of the horizontal disparity map and the motion vector;
   (d) decoding the quantized data of the luminance residual texture based on the quantized data of the luminance residual texture and the motion vector;
   (e) performing disparity compensation based on the reconstructed first image and the decoded horizontal disparity map, and outputting disparity-compensated luminance texture; and
   (f) adding the disparity-compensated luminance texture and the luminance residual texture reconstructed in (d) to reconstruct the second image.

13. The method of claim 12, wherein the first image is a left image, and the second image is a right image.

14. The method of claim 12, wherein the step (a) comprises receiving the encoding stream, and additionally outputting quantized data of chrominance residual texture, the step (d) comprises additionally decoding the quantized data of chrominance residual texture based on the quantized data of chrominance residual texture and the motion vector, and the step (f) comprises additionally adding the disparity-compensated chrominance texture and the chrominance residual texture to reconstruct the second image.

15. A method for encoding stereoscopic video including first and second images, comprising:
   (a) encoding the first image, and outputting a quantized video object and a motion vector of the first image;
   (b) decoding the quantized video object output in (a), and reconstructing the first image;
   (c) receiving the first and second images, and finding a pixel-based horizontal disparity map and a pixel-based vertical disparity map on the second image with reference to the first image;
   (d) encoding the horizontal disparity map and outputting a quantized horizontal disparity map based on the pixel-based horizontal disparity map and the motion vector,
   (e) encoding the vertical disparity map and outputting a quantized vertical disparity map based on the pixel-based vertical disparity map and the motion vector;
   (f) reconstructing the quantized horizontal disparity map output in (d), and outputting a reconstructed horizontal disparity map;
   (g) reconstructing the quantized vertical disparity map output in (d), and outputting a reconstructed vertical disparity map;
   (h) performing disparity compensation and outputting a pixel value of a disparity-compensated second image based on a pixel value of the first image reconstructed in (b), a horizontal disparity vector value of the horizontal disparity map reconstructed in (f), and a vertical disparity vector value of the vertical disparity map reconstructed in (h); and
   (i) performing a residual process on the pixel value of the second image and the pixel value of the disparity-compensated second image output in (h) to output luminance residual texture, and encoding the luminance residual texture to output quantized luminance residual texture; and (i) performing variable length encoding on the quantized video object, the motion vector, the quantized horizontal disparity map, the quantized vertical disparity map, and the quantized luminance residual texture, and outputting the quantized video object, the motion vector, the quantized horizontal map, the quantized vertical disparity map, and the quantized luminance residual texture on which the variable length encoding is performed as a single stream.

16. The method of claim 15, wherein the quantized horizontal disparity map, the quantized vertical disparity map, and the quantized luminance residual texture are allocated to the MPEG-4 MAC and then encoded.

17. The method of claim 15, wherein the first image is a left image, and the second image is a right image.

18. The method of claim 15, further comprising (j) performing a residual process on the pixel value of the second image and the pixel value of the disparity-compensated second image output in (h) to output chrominance residual texture, and encoding the chrominance residual texture to output quantized chrominance residual texture.

19. The method of claim 18, further comprising (k) performing variable length encoding on the quantized video object, the motion vector, the quantized horizontal disparity map, the quantized vertical disparity map, the quantized luminance residual texture, and the quantized chrominance residual texture, and outputting outputting the quantized video object, the motion vector, the quantized horizontal disparity map, the quantized vertical disparity map, the quantized luminance residual texture, and the quantized chrominance residual texture on which the variable length coding is performed as a single stream.

20. A method for decoding stereoscopic video including first and second images, comprising:
   (a) receiving an encoding stream, and outputting quantized video data of a video object of the first image, a motion vector, quantized data of a horizontal disparity map, quantized data of a vertical disparity map, and quantized data of luminance residual texture by performing variable length decoding on the encoding stream.
   (b) decoding the video object and reconstructing the first image based on the quantized data of the video object and the motion vector;
   (c) decoding the quantized data of the horizontal disparity map based on the quantized data of the horizontal disparity map and the motion vector,
   (d) decoding the quantized data of the vertical disparity map based on the quantized data of the vertical disparity map and the motion vector;
   (e) decoding the quantized data of the luminance residual texture based on the quantized data of the luminance residual texture and the motion vector;
   (f) performing disparity compensation based on the reconstructed first image, the decoded horizontal disparity map, and the decoded vertical disparity map, and outputting disparity-compensated luminance texture; and
   (g) adding the disparity-compensated luminance texture and the luminance residual texture reconstructed in (e) to reconstruct the second image.

21. The method of claim 20, wherein the step (a) comprises receiving the encoding stream, and additionally outputting quantized data of chrominance residual texture; the step (e) comprises additionally decoding the quantized data, of chrominance residual texture based on the quantized data of chrominance residual texture and the motion vector, and the step (g) comprises additionally adding the disparity-compensated chrominance texture and the chrominance residual texture to reconstruct the second image.

22. An encoder for stereoscopic video including first and second images, comprising:
 a video object encoder for encoding the first image, and outputting a quantized video object and a motion vector of the first image;
 a disparity estimator for receiving the first and second images, and finding a pixel-based horizontal disparity map on the second image with reference to the first image; and
 An auxiliary component encoder for encoding the horizontal disparity map and outputting a quantized horizontal disparity map based on the pixel-based horizontal disparity map output by the disparity estimator and a motion vector output by the video object encoder; and a variable length encoder for performing variable length encoding on the quantized video object, the motion vector, and the quantized horizontal disparity map, and outputting the quantized video object, the motion vector and the quantized horizontal disparity map on which the variable length coding is performed as a single stream.

23. A decoder for stereoscopic video including first and second images, comprising:
 A variable length decoder for receiving an encoding stream, and performing variable length decoding on said encoding stream to output quantized data of video object ob the first image, a motion vector, and quantized data of a horizontal disparity map;
 a video object decoder for decoding the video object and reconstructing the first image based on the quantized data of the video object and the motion vector output by the variable length decoder,
 an auxiliary component decoder for decoding the quantized data of the horizontal disparity map based on the quantized data of the horizontal disparity map and the motion vector output by the variable length decoder; and
 a disparity compensator for performing disparity compensation based on the reconstructed first image output by the video object decoder and the decoded horizontal disparity map output by the auxiliary component decoder, and reconstructing the second image.

24. An encoder for stereoscopic video including first and second images, comprising:
 a video object encoder for encoding the first image to output a quantized video object and a motion vector of the first image, and encoding the quantized video object to output a reconstructed first image;
 a disparity estimator for receiving the first and second images, and finding a pixel-based horizontal disparity map on the second image with reference to the first image;
 a first auxiliary component encoder for encoding the horizontal disparity map to output a quantized horizontal disparity map, and decoding the output and quantized horizontal disparity map to output a reconstructed horizontal disparity map based on the pixel-based horizontal disparity map output by the disparity estimator and the motion vector output by the video object encoder,
 a disparity compensator for performing disparity compensation and outputting a pixel value of a disparity-compensated second image based on a pixel value of the reconstructed first image output by the video object encoder and a horizontal disparity vector value of the, reconstructed horizontal disparity map output by the first auxiliary component encoder, and
 a second auxiliary component encoder for performing a residual process on the pixel value of the second image and the pixel value of the disparity-compensated second image output buy the disparity compensator to output luminance residual texture, and encoding the luminance residual texture to output quantized luminance residual texture; and a variable length encoder for performing variable length encoding on the quantized video object, the motion vector, the quantized horizontal disparity map, and the quantized luminance residual texture, and outputting the quantize video object, the motion vector, the quantized horizontal disparity map, and the quantized luminance residual texture on which the variable length coding is performed as a single stream.

25. The encoder of claim 24, wherein the quantized horizontal disparity map and the quantized luminance residual texture are allocated to the MPEG-4 MAC and then encoded.

26. The encoder of claim 24, further comprising a third auxiliary component encoder for performing a residual process on the pixel value of the second image and the pixel value of the disparity-compensated second image output by the disparity compensator to output chrominance residual texture, and encoding the chrominance residual texture to output quantized chrominance residual texture.

27. The encoder of claim 26, wherein the variable length encoder performing the variable length encoding on the quantized chrominance residual texture in addition to the quantized video object, the motion vector, the quantized horizontal disparity map, and the quantized luminance residual texture, and outputting the quantized video object, the motion vector the quantized horizontal disparity map, the quantized luminance residual texture, and the quantized chrominance residual texture on which the variable length coding is performed as the single stream.

28. The encoder of claim 26, wherein the quantized horizontal disparity map, the quantized luminance residual texture, and the quantized chrominance residual texture are allocated to the MPEG-4 MAC and then encoded.

29. The encoder of claim 24, wherein the disparity estimator additionally outputs a pixel-based vertical disparity map on the second image with reference to the first image;
 the encoder for stereoscopic video further comprises a third auxiliary component encoder for encoding the vertical disparity map and outputting a quantized vertical disparity map based on the pixel-based vertical disparity map output by the disparity estimator and the motion vector output by the video object encoder; and
 the disparity compensator performs disparity compensation and outputs a pixel value of the disparity-compensated second image based on the pixel value of the reconstructed first image, a horizontal disparity vector value of the reconstructed horizontal disparity map, and the reconstructed vertical disparity map.

30. The encoder of claim 29, wherein the variable length encoder performs the variable length encoding on the quantized vertical disparity map in addition to the quantized video object, the motion vector, the quantized horizontal disparity map, and the quantized luminance residual texture, and outputting the quantized video object, the motion vector, the quantized horizontal disparity map, the quantized vertical disparity map, and the quantized luminance residual texture on which the variable length coding is performed as the single stream.

31. The encoder of claim 29, wherein the quantized horizontal disparity map, the quantized vertical disparity map, and the quantized luminance residual texture are allocated to the MPEG-4 MAC and then encoded.

32. The encoder of claim 29, further comprising a fourth auxiliary component encoder for performing a residual process on the pixel value of the second image and the pixel value of the disparity-compensated second image output by the disparity compensator to output chrominance residual texture, and encoding the chrominance residual texture to output quantized chrominance residual texture.

33. The encoder of claim 32, wherein the variable length encoder performs the variable length encoding on the quantized chrominance residual texture in addition to the quantized video object, the motion vector, the quantized horizontal disparity map, the quantized vertical disparity map, and the quantized luminance residual texture, and outputting the quantized video object, the motion vector, the quantized horizontal disparity map, the quantized vertical disparity map, the quantized luminance residual texture, and the quantized chrominance residual texture on which the variable length coding is performed as the single stream.

34. The encoder of claim 24, wherein the video object encoder comprises:
- an encoding unit for performing a residual process on the first image and the motion compensated data, performing discrete cosine transform and quantization on the data, and outputting a quantized video object;
- a decoding unit for performing dequantization and inverse discrete cosine transform on the quantized video object output by the encoding unit, reconstructing the video object data, and storing the reconstructed video object data in a memory;
- a motion estimator for comparing the first image with the reconstructed video object data of a previous frame stored in the memory, and outputting a motion vector; and
- a motion compensator for comparing the motion vector output by the motion estimator with the reconstructed video object data of a previous frame stored in the memory, and outputting motion compensation data.

35. The encoder of claim 34, wherein the first auxiliary component encoder comprises:
- an encoding unit for performing a residual process on the horizontal disparity map and the motion compensated data, performing discrete cosine transform and quantization on the data, and outputting a quantized horizontal disparity map;
- a decoding unit for performing dequantization and inverse discrete cosine transform on the quantized horizontal disparity map output by the encoding unit, reconstructing the horizontal disparity map, and storing the reconstructed horizontal disparity map in a memory; and
- a motion compensator for comparing the motion vector output by the motion estimator of the video object encoder with the reconstructed horizontal disparity map of a previous frame stored in the memory, and outputting motion compensation data.

36. A decoder for stereoscopic video including first and second images, comprising:
- a variable length decoder for receiving an encoding stream, and perform variable length decoding on said encoding stream to output quantized data of a video object of the first image, a motion vector, quantized data of a horizontal disparity map, and quantized data of luminance residual texture;
- a video object decoder for decoding the video object and reconstructing the first image based on the quantized data of the video object and the motion vector;
- a first auxiliary component decoder for decoding the quantized data of the horizontal disparity map based on the quantized data of the horizontal disparity map and the motion vector;
- a second auxiliary component decoder for decoding the quantized data of the luminance residual texture based on the quantized data of the luminance residual texture and the motion vector
- a disparity compensator for performing disparity compensation based on the reconstructed first image output by the video object decoder and the decoded horizontal disparity map output by the first auxiliary component decoder, and outputting disparity-compensated luminance texture and disparity-compensated chrominance texture; and
- a first adder for adding the disparity-compensated luminance texture output by the disparity compensator and the reconstructed luminance residual texture output by the second auxiliary component decoder.

37. The decoder of claim 36, wherein the variable length decoder additionally outputs quantized data of chrominance residual-texture, and the decoder for stereoscopic video further comprises:
- a third auxiliary component decoder for decoding the quantized data of chrominance residual texture based on the quantized data of the chrominance residual texture and the motion vector output, by the variable length decoder, and
- a second adder for adding the disparity-compensated chrominance texture output by the disparity compensator and the reconstructed chrominance residual texture output by the third auxiliary component decoder.

38. The decoder of claim 36, wherein the variable length decoder additionally outputs quantized data of a vertical disparity map;
- the decoder for stereoscopic video further comprises a third auxiliary component decoder for decoding the quantized data of the vertical disparity map based on the quantized data of the vertical disparity map and the motion vector output by the variable length decoder; and
- the disparity compensator performs disparity compensation based on the reconstructed first image output by the video object decoder, the decoded horizontal disparity map output by the first auxiliary component decoder, and the decoded vertical disparity map output by the third auxiliary component decoder, and outputs the disparity-compensated luminance texture and the disparity-compensated chrominance texture.

39. The decoder of claim 38, wherein the variable length decoder additionally outputs quantized data of chrominance residual texture, and the decoder for stereoscopic video further comprises:
- a fourth auxiliary component decoder for decoding the quantized data of chrominance residual texture based on the quantized data of the chrominance residual texture and the motion vector output by the variable length decoder, and a second adder for adding the disparity-compensated chrominance texture output by the disparity compensator and the reconstructed chrominance residual texture output by the third auxiliary component decoder.

40. The decoder of claim 36, wherein the video object decoder comprises:

a dequantizer for dequantizing the quantized data of the video object output by the variable length decoder;

an IDCT (inverse discrete cosine transformer) for performing inverse discrete cosine transform on the data output by the dequantizer;

a motion compensator for comparing the reconstructed video object data of a previous frame with the motion'vector to compensate for motion, and outputting a motion vector; and an adder for adding the video object output by the IDCT and the motion compensated data output by the motion compensator.

41. The decoder of claim 36, wherein the first auxiliary component decoder comprises:

a dequantizer for dequantizing the quantized data of the horizontal disparity map output by the variable length decoder;

an IDCT (inverse discrete cosine transformer) for performing inverse discrete cosine transform on the data output by the dequantizer, a motion compensator for comparing the reconstructed horizontal disparity map of a previous frame with the motion vector to compensate for motion, and outputting a motion vector; and an adder for adding the horizontal disparity map output by the IDCT and the motion compensated data output by the motion compensator.

* * * * *